(12) United States Patent
Thompson et al.

(10) Patent No.: US 6,288,548 B1
(45) Date of Patent: Sep. 11, 2001

(54) METHOD AND APPARATUS FOR MAKING ELECTROMAGNETIC INDUCTION MEASUREMENTS THROUGH A DRILL COLLAR

(75) Inventors: Larry W. Thompson, Willis; Macmillan M. Wisler, Kingwood, both of TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 08/786,060

(22) Filed: Jan. 21, 1997

Related U.S. Application Data

(63) Continuation of application No. 08/283,933, filed on Aug. 1, 1994, now abandoned.

(51) Int. Cl.$^7$ ................................ G01V 3/18; G01V 3/28; F21B 49/00
(52) U.S. Cl. ............................................ 324/339; 324/369
(58) Field of Search ..................................... 324/338, 339, 324/340, 341, 342, 343, 356, 369; 73/152.02, 152.03

(56) References Cited

U.S. PATENT DOCUMENTS

| | | | |
|---|---|---|---|
| 3,293,542 | * 12/1966 | Piety ..................................... | 324/369 |
| 3,891,916 | 6/1975 | Meador et al. ......................... | 324/6 |
| 4,107,598 | 8/1978 | Meador et al. ......................... | 324/6 |

(List continued on next page.)

FOREIGN PATENT DOCUMENTS

| | | |
|---|---|---|
| 0102091 | 3/1984 | (EP) . |
| 0375549A2 | 6/1990 | (EP) . |
| 0646810A2 | 4/1995 | (EP) . |
| 2290385 | 12/1995 | (GB) . |
| WO84/01439 | 4/1984 | (WO) . |
| WO 93/07514 | 4/1993 | (WO) . |

OTHER PUBLICATIONS

M.R. Taherain et al, "Measurement of dielectric response of water–satureated rocks", Geophysics, vol. 55, No. 12, Dec. 1990, pp. 1530–1541.

J.G. Williams: "Developments in Composite Structures for the Offshore Oil Industry", Offshore Technology Conference, OTC 6579, 1991, pp. 165–177.

W.H. Meyer, "Inversion of 2 MHz Propogation Resistivity Logs", SPWLA 33$^{rd}$ Annual Logging Symposium, Jun. 14–15, 1992, pp. 1–21.

Primary Examiner—Walter E. Snow
(74) Attorney, Agent, or Firm—Madan, Mossman & Sriram, P.C.

(57) ABSTRACT

A method and apparatus is disclosed for performing measurement-while-drilling operations in a borehole to interrogate the borehole and the surrounding formation utilizing electromagnetic fields. A measurement sonde is provided which includes at least one of (a) a transmitting member for generating an interrogating electromagnetic field for passage through the borehole and surrounding formation, and (b) a receiving member for receiving an interrogating electromagnetic field after passage through said borehole and surrounding formation. A measurement tubular is provided, which includes a central bore which communicates with the central bore of the drillstring. The measurement tubular couples in the drillstring in a selected location, and permits interrogation of the borehole and surrounding formation with the interrogating electromagnetic fields generated by the measurement sonde. Preferably, the measurement tubular is formed at least partially of a non-conducting or poorly-conducting material which will allow the inward and outward passage of electromagnetic fields. The measurement sonde is secured within the central bore of the measurement tubular. Preferably, it is releasably secured therein, and can be run in and out of the wellbore during drilling operations without substantial interference with drilling operations.

17 Claims, 16 Drawing Sheets

U.S. PATENT DOCUMENTS

| | | | |
|---|---|---|---|
| 4,216,536 | 8/1980 | More | 367/83 |
| 4,308,499 | 12/1981 | Thierbach et al. | 324/337 |
| 4,703,277 | 10/1987 | Kenyon et al. | 324/323 |
| 4,720,681 | 1/1988 | Sinclair | 324/339 |
| 4,730,161 | 3/1988 | Cox et al. | 324/338 |
| 4,780,679 | 10/1988 | Kenyon et al. | 324/338 |
| 4,786,873 | 11/1988 | Sherman | 324/323 |
| 4,873,488 | 10/1989 | Barber et al. | 324/339 |
| 4,899,112 | 2/1990 | Clark et al. | 324/338 |
| 4,968,940 | 11/1990 | Clark et al. | 324/338 |
| 5,065,099 | 11/1991 | Sinclair et al. | 324/339 |
| 5,081,419 | 1/1992 | Meador et al. | 324/338 |
| 5,089,989 | 2/1992 | Schmidt et al. | 367/35 |
| 5,144,245 | 9/1992 | Wisler | 324/338 |
| 5,157,331 | 10/1992 | Smith | 324/338 |
| 5,157,605 | 10/1992 | Chandler et al. | 364/422 |
| 5,187,661 | 2/1993 | Sinclair | 364/422 |
| 5,210,495 | 5/1993 | Hapashy et al. | 324/338 |
| 5,278,507 | 1/1994 | Bartel et al. | 324/338 |
| 5,345,179 | 9/1994 | Habashy et al. | 324/338 |
| 5,367,262 | 11/1994 | Manning | 324/341 |
| 5,402,068 | 3/1995 | Meador et al. | 324/338 |
| 5,563,512 * | 10/1996 | Mumby | 324/339 |
| 5,939,885 | 8/1999 | McClure et al. | 324/338 |

* cited by examiner

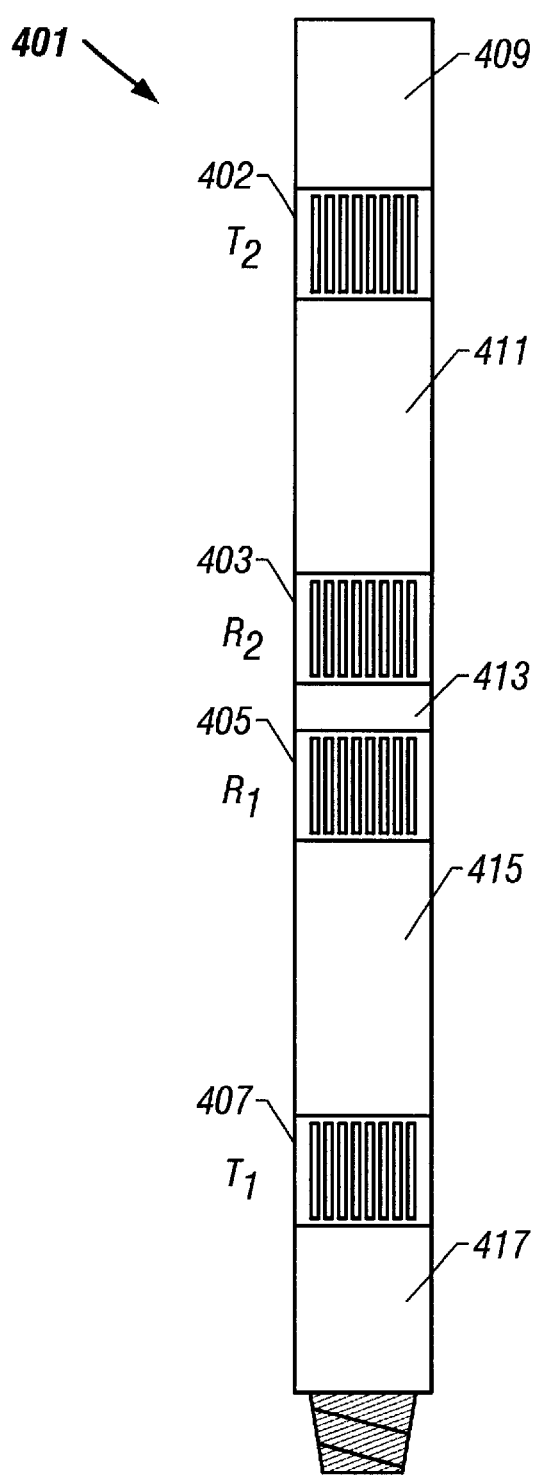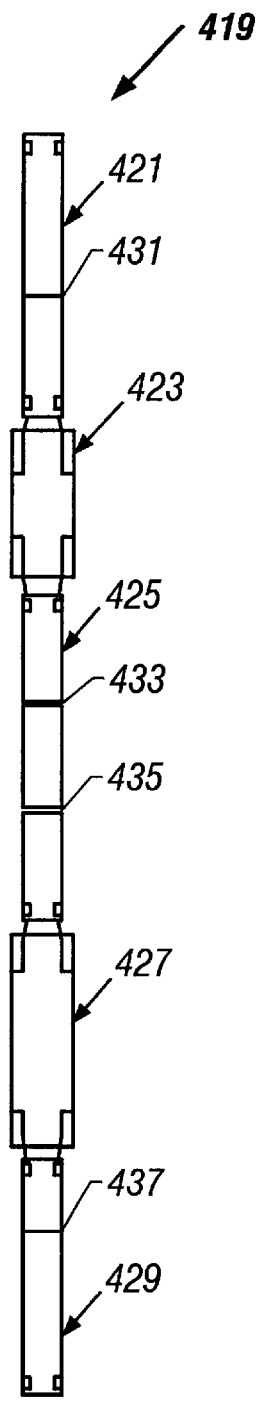
*FIG. 3A-1*     *FIG. 3A-2*

METHOD AND APPARATUS FOR MAKING ELECTROMAGNETIC INDUCTION MEASUREMENTS THROUGH A DRILL COLLAR

This is a continuation of application Ser. No. 08/283,933, filed Aug. 1, 1994, now abandoned.

BACKGROUND OF THE INVENTION

1. Field of the Invention

The present invention relates in general to measurement-while-drilling systems, and in particular relates to measurement-while-drilling systems which transmit or receive electromagnetic fields.

2. Description of the Prior Art

Measurement-while-drilling systems are now essential components of sophisticated exploration operations, and are utilized to provide real-time data pertaining to drilling conditions as well as the wellbore and surrounding formations. In particular, resistivity logs can be developed during drilling operations which, in some cases, provide a full substitute for the more conventional wireline electric logs. Other types of logging operations are also conducted in measurement-while-drilling systems, including neutron porosity measurements which provide a measure of the wellbore and formation porosity. The resistivity measurements can be utilized to provide a measure of the formation resistivity, the borehole diameter, the diameter of invasion of drilling mud into the formation, and to detect formation boundaries and formation changes.

In prior art systems, it is conventional to place the transmitting and receiving antennas of the measurement-while-drilling system within the tubular body of a drill collar or drill pipe member. Most commonly, a portion of the drill collar or drill pipe is "necked-down" (that is, milled or cut to a reduced radical dimension), to provide a relatively safe location for placement of the transmitting and receiving antennas. This, of course, structurally weakens the drill pipe or drill collar member, and renders it more susceptible to mechanical failure during drilling operations. In the prior art devices, the antennas are placed in or about the exterior surface of the drill pipe or drill collar member, since the drill pipe or drill collar member is typically formed from steel. Electromagnetic radiation cannot effectively be transmitted through steel tubulars, since the steel is a highly conductive material, and since the electromagnetic fields generate eddy currents in the conductive material which dissipate the field. The required exterior placement of the transmitted and receiving antennas exposes the antennas to the not-insubstantial forces which arise as the drill pipe or drill collar drags or otherwise engages the wellbore wall. Additionally, cuttings from the formation are circulated upward through the annulus between the drillstring and the wellbore. Cuttings which are propelled at high velocities can become lodged in the antenna assemblies and/or otherwise damage the antenna assemblies through abrasion. Additionally, the construction costs of a tool which has antennas which are part of the collar are high, since an expensive steel drill collar is machined with features which provide for the placement of antenna parts and for housing of the electronics which communicate with the antennas. Maintenance costs are also high for the prior art devices, especially since the tools include a heavy collar which can not be transported easily and since the tool can not be separated easily for replacement or servicing.

SUMMARY OF THE INVENTION

It is one objective of the present invention to provide an improved measurement-while-drilling system which utilizes a measurement tubular which is at least partially formed of a material which is non-conducting or poorly-conducting, and thus which allows the passage of electromagnetic fields both radially inward and radially outward relative to the measurement tubular.

It is another objective of the present invention to provide a measurement-while-drilling system which utilizes a transmissive measurement tubular which allows for the passage of electromagnetic fields through the tubular body, in combination with a measurement sonde which is disposed within the central bore of the measurement tubular, and which can be utilized to transmit interrogating electromagnetic signals into the formation and receive electromagnetic radiation from the borehole and surrounding formation to measure one or more borehole or formation characteristics.

These and other objectives are achieved as is now described in the context of formation resistivity measurement operations. When characterized as an apparatus, the present invention is directed to a measurement-while-drilling apparatus for use in a drillstring during drilling operations to interrogate a borehole and surrounding formation. The measurement-while-drilling apparatus includes a number of components which cooperate. A measurement sonde is provided and includes a transmitting member for generating an interrogating electromagnetic field for passage through the borehole and surrounding formation, and a receiving member for receiving an interrogating electromagnetic field after passage through the borehole and surrounding formation. A measurement tubular is also provided which includes a central bore which communicates with a central bore of the drillstring. A measurement tubular couples in the drillstring to locate the measurement sonde in a particular position, and to permit interrogation of the borehole and surrounding formation with the interrogating electromagnetic field. A means is provided for securing the measurement sonde in a particular location within the central bore of the measurement tubular. The measurement-while-drilling apparatus is operable in at least a transmission mode of operation and a reception mode of operation, which preferably occur simultaneously. During transmission operations, the interrogating electromagnetic field is generated by the measurement sonde and radiated outward from the measurement sonde and through the measurement tubular into the borehole and surrounding formation. During reception operations, the interrogating electromagnetic field passes from the borehole and surrounding formation through the measurement tubular for detection by the receiving member. In the preferred embodiment transmission and reception operations occur simultaneously.

In one particular embodiment, the measurement tubular comprises a solid cylindrical tubular formed of either non-conducting or poorly-conducting material which allows for the inward and outward passage of electromagnetic fields. In another embodiment, the measurement tubular includes a plurality of axial slots in a steel skeletal structure which are filled with non-conducting or poorly-conducting material, which allow for the passage of the interrogating electromagnetic field from the central bore of the measurement tubular to the borehole and surrounding formation. The most typical application of the present invention requires that the measurement tubular be a drill collar member for coupling at a lowermost portion of a drillstring.

In the preferred embodiment of the present invention, the measurement sonde includes a retrieval member which allows for (1) retrieval of the measurement sonde from the measurement tubular drilling operations without substantial interference with the drilling operations, and (2) placement of the measurement sonde in the measurement tubular during drilling operations without substantial interference with drilling operations.

When characterized as a method, the present invention is directed to a method of interrogating a borehole and surrounding formation during drilling operations, and includes a number of method steps. A measurement tubular is provided which is formed at least partially of a material which allows substantially unimpeded passage of electromagnetic fields, and which includes a central bore. A measurement sonde is provided. The measurement sonde includes a transmitting member for generating an interrogating electromagnetic field for passage through the borehole and surrounding formation, and a receiving member for receiving an interrogating an electromagnetic field after passage through the borehole and surrounding formation. The measurement sonde is secured within the central bore of the measurement tubular. The measurement tubular is coupled in a selected location within a drillstring. The measurement sonde is utilized during drilling operations to interrogate the borehole and surrounding formation, by operating in a transmission mode of operation and a reception mode of operation. During a transmission mode of operation, the interrogating electromagnetic field is generated by the measurement sonde and radiated outward from the measurement sonde and through the measurement tubular into the borehole and surrounding formation. During a reception mode of operation, the interrogating electromagnetic field passes from the borehole and surrounding formation and through the measurement tubular for detection by the receiving member.

Additional objectives, features and advantages will be apparent in the written description which follows, but one principle advantage includes the ease of separation of the drill collar part of the logging tool from the sonde part of the logging tool. Thus the sonde part can be manufactured, tested, transported, and repaired independently of the collar in which it is housed during measurement-while-drilling operations.

BRIEF DESCRIPTION OF THE DRAWINGS

The novel features believed characteristics of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 3A and 3B depict one particular embodiment of the present invention;

DETAILED DESCRIPTION OF THE INVENTION

Figure 1A:
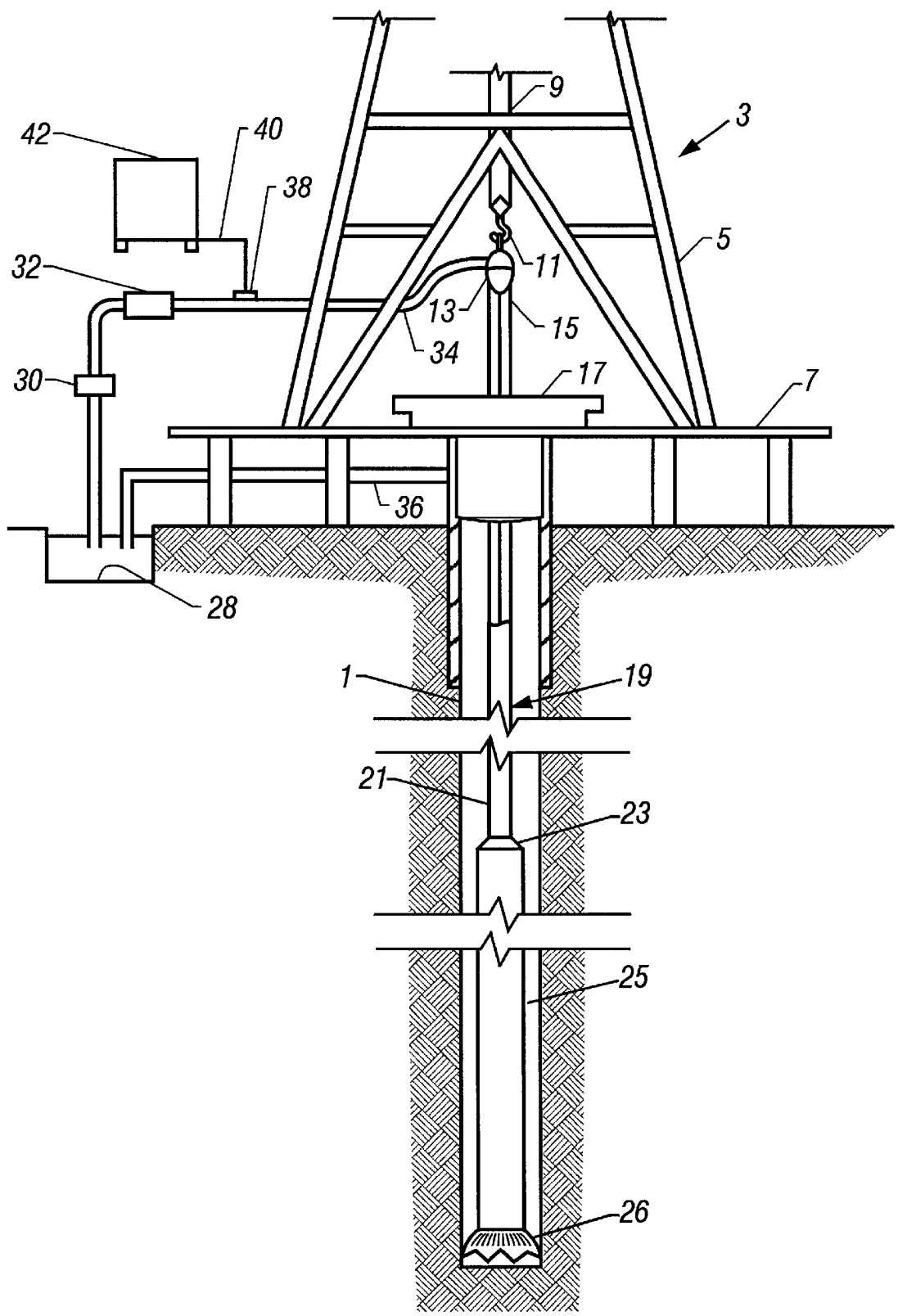
FIG. 1A is a simplified depiction of a drilling rig, a drillstring and a wellbore equipped with an apparatus for interrogating the borehole in accordance with the present invention.

With reference to FIG. 1A, there will now be described an overall simultaneous drilling and logging system in accordance with one preferred embodiment of the present invention that incorporates an electromagnetic wave propagation (EWP) resistivity measurement system according to this invention.

A well 1 is being drilled into the earth under control of surface equipment including a rotary drilling rig 3. In accord with a conventional arrangement, rig 3 includes a derrick 5, derrick floor 7, draw works 9, hook 11, swivel 13, kelly joint 15, rotary table 17, and drill string 19 that includes drill pipe 21 secured to the lower end of kelly joint 15 and to the upper end of a section of drill collars including an upper drill collar 23, an intermediate drill collar or sub (not separately shown), and a lower drill collar measurement tubular 25 immediately below the intermediate sub. A drill bit 26 is carried by the lower end of measurement tubular 25.

Drilling fluid (or "mud", as it is commonly called) is circulated from a mud pit 27 through a mud pump 29, past a desurger 31, through a mud supply line 33, and into swivel 13. The drilling mud flows down through the kelly joint and an axial tubular conduit in the drill string, and through jets (not shown) in the lower face of the drill bit. The drilling mud flows back up through the annular space between the outer surface of the drill string and the inner surface of the borehole to be circulated to the surface where it is returned to the mud pit through a mud return line 35. A shaker screen (not shown) separates formation cuttings from the drilling mud before it returns to the mud pit.

Figure 2A:
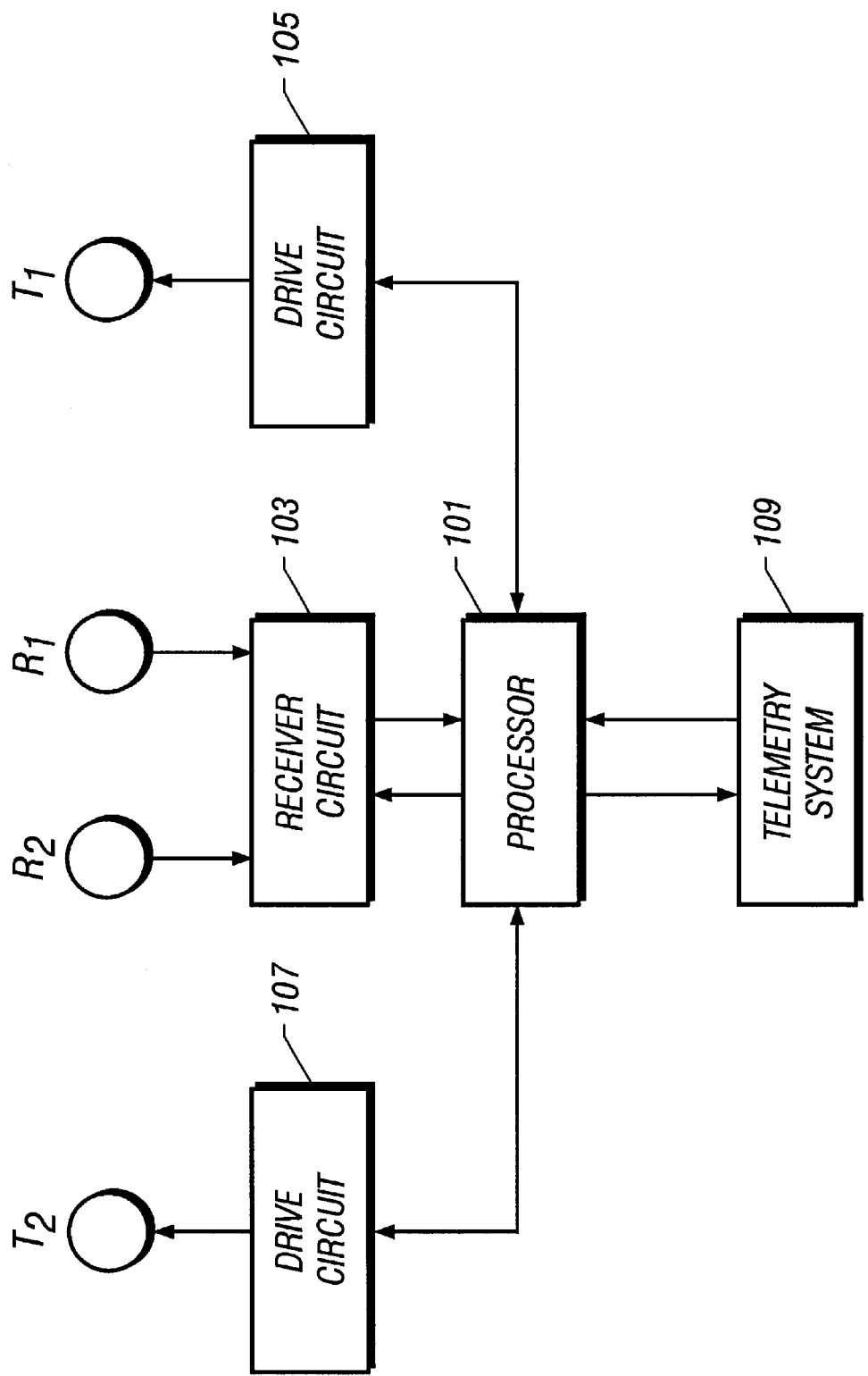
FIGS. 2A through 2E depict the electronic components of the logging apparatus in accordance with the present invention.
Figure 2B:
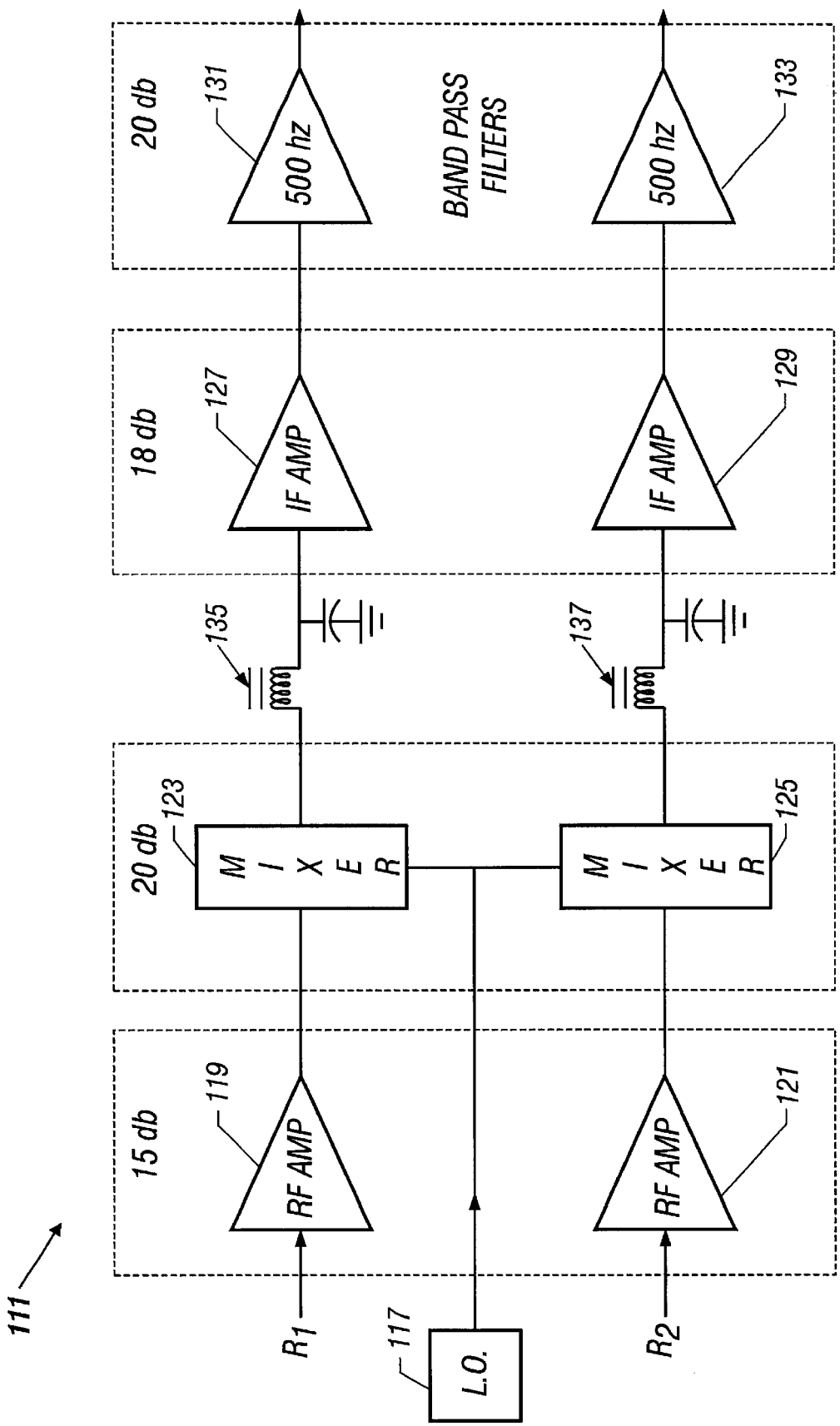
Figures 1, 2C:
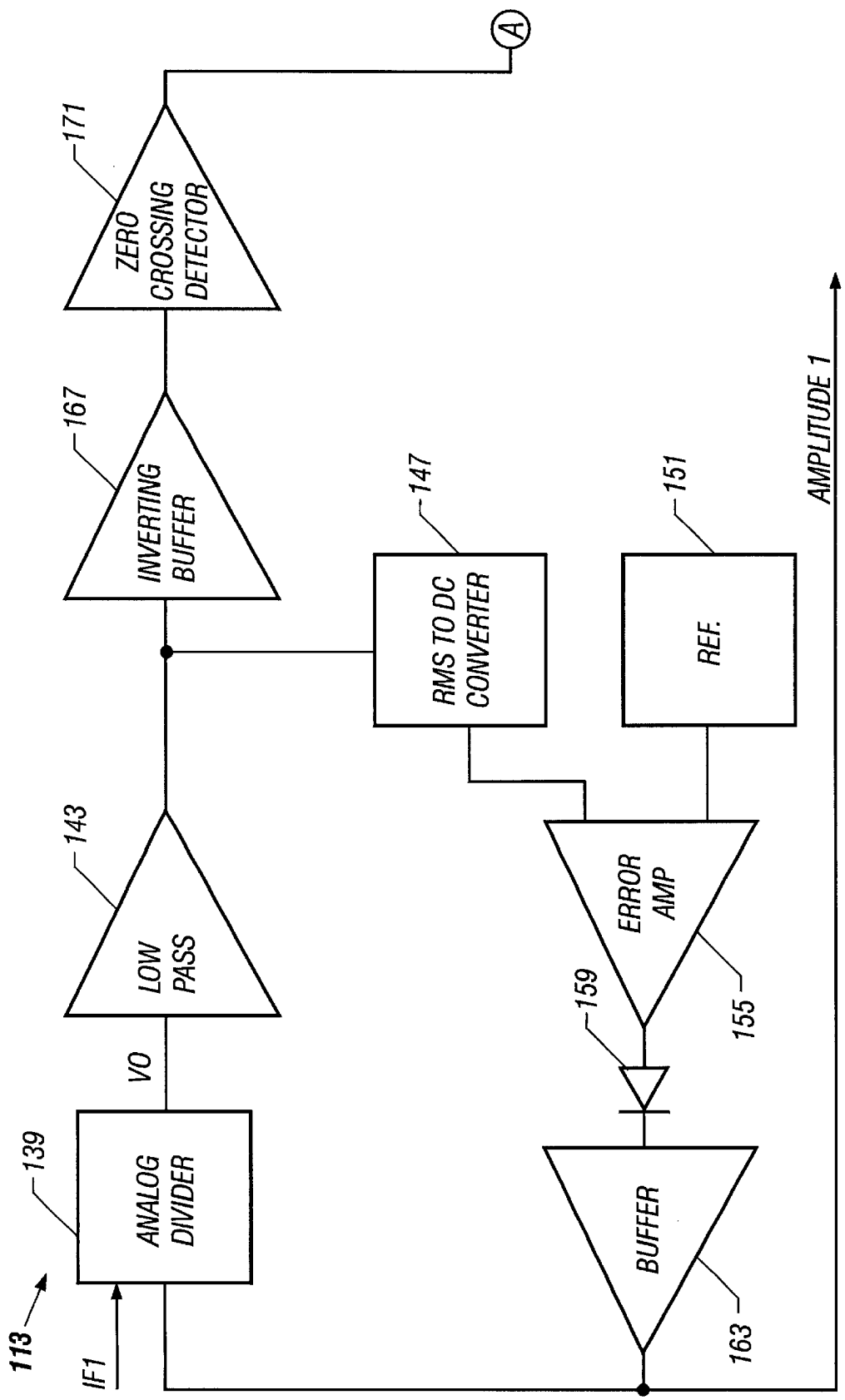
Figures 2, 2C:
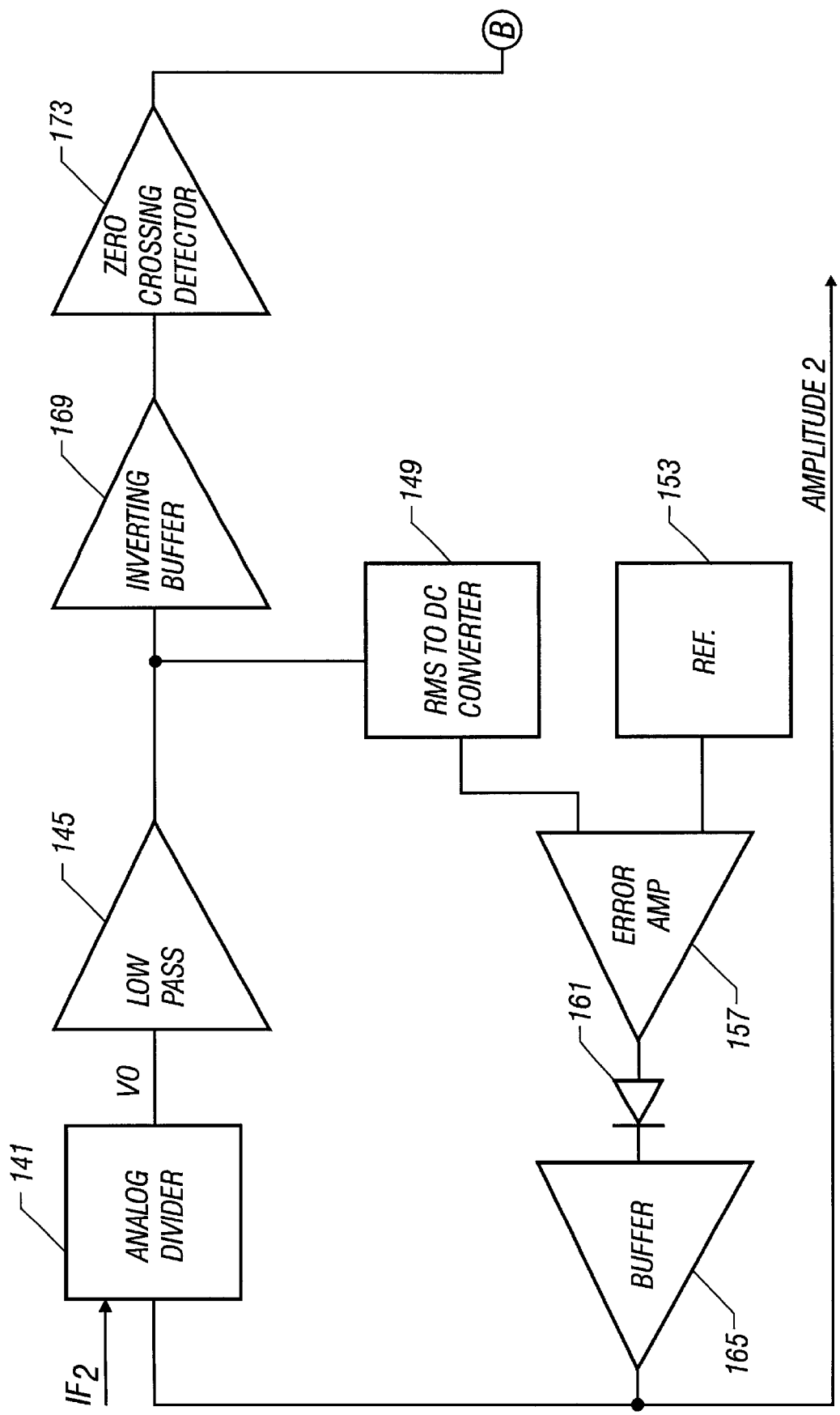

The overall system of FIG. 1 uses mud pulse telemetry techniques to communicate data from downhole to the surface while drilling operation takes place. To receive data at the surface, there is a transducer 37 in mud supply line 33. This transducer generates electrical signals in response to drilling mud pressure variations, and these electrical signals are transmitted by a surface conductor 39 to a surface electronic processing system 41.

As explained in U.S. Pat. No. 4,216,536 to More (More '536 patent), which is incorporated herein by reference as if fully set forth, mud pulse telemetry techniques provide for communicating data to the surface about numerous downhole conditions sensed by well logging transducers or measurement systems that ordinarily are located on and within the drill collar nearest the drill bit. Measurement tubular 25 is preferably nearest the drill bit, as shown in FIG. 1. The mud pulses that define the data propagated to the surface are produced by equipment within the intermediate sub. Such equipment suitably comprises a pressure pulse generator operating under control of electronics contained within an instrument housing to allow drilling mud to vent through an orifice extending through the logging collar wall. Each time the pressure pulse generator causes such venting, a negative pressure pulse is transmitted to be received by surface transducer 37. An alternative conventional arrangement generates and transmits positive pressure pulses.

The circulating drilling mud provides a source of energy for a turbine-driven generator sub-assembly located in the intermediate sub, and the turbine-driven generator sub-assembly generates electrical power for the pressure pulse generator and for various circuits including circuits forming part of the preferred embodiment of this invention. As an alternative or supplemental source of electrical power, batteries may be provided, particularly as a back-up for the turbine-driven generator.

A measurement system embodying the present invention includes electronics contained in electronics housings contained within measurement sonde 27, and contains elements arranged in recesses or necked-down portions of the tubular steel housing of measurement sonde 27. Some of these elements of measurement sonde 27 are indicated schematically in FIG. 1C and include upper transmitting antenna 29, lower transmitting antenna 31, and intermediate receiving antennas 33, 35 which are carried about an exterior surface of measurement sonde 27, and which are utilized to interrogate the borehole and surrounding formation, as will be discussed in greater detail herebelow. In alternative embodiments, a greater or lesser number of transmitting or receiving antennas may be utilized.

Figure 1B:
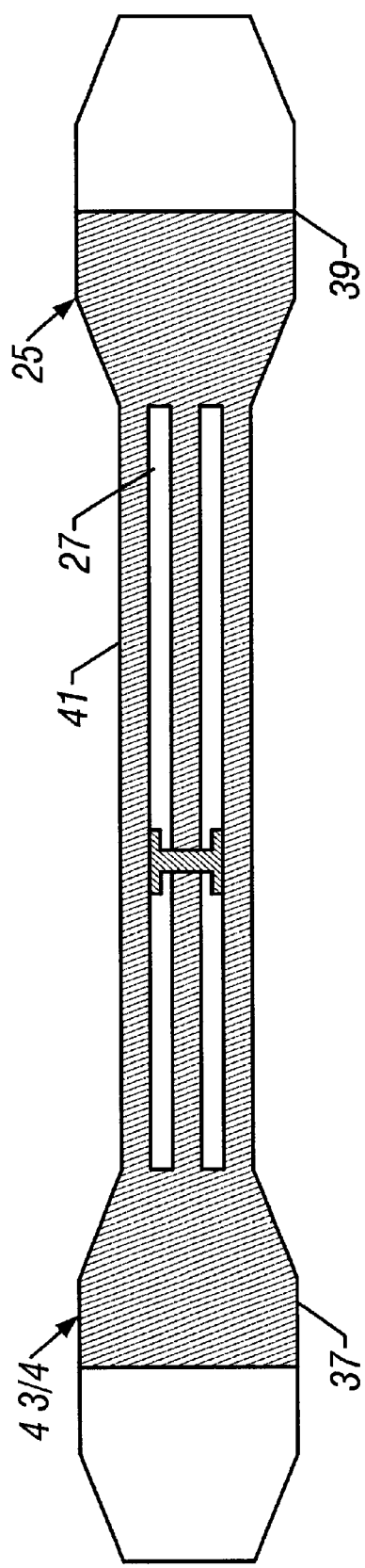
FIG. 1B is a partial longitudinal section view of a measurement tubular and measurement sonde in accordance with the present invention.
Figure 1C:
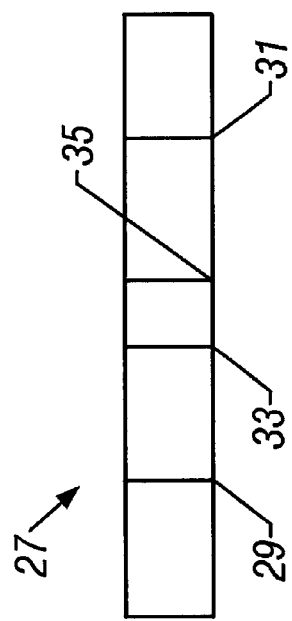
FIG. 1C is a simplified schematic view of the antenna arrangement of the measurement sonde of FIG. 1B.

FIG. 1B depicts one embodiment of measurement tubular 25, which includes upper, internally threaded tool joint 37 and lower, internally threaded tool joint 39, which are adapted to couple within a drillstring, with a central section 41 disposed therebetween which is formed of a material which allows the inward and outward propagation of electromagnetic fields, to allow the transmitting antennas 29, 31 and receiving antennas 33, 35 of measurement sonde 27 to communicate with the surrounding borehole and formation. In accordance with the preferred embodiment of the present invention, central section 41 is formed of a material which is either "poorly-conducting" or "non-conducting". For purposes of this disclosure, semi-conductors are defined as materials which have a bulk resistivity value of greater than 0.001 Ohm-meters and less than 100 Ohm-meters. For purposes of this disclosure, non-conducting materials are defined as those materials which have bulk resistivity values which are greater than 100 Ohm-meters. Also, for purposes of this disclosure, "good" conducting materials are defined as having a resistivity of less than 0.001 ohm-meters. Central section 41 need merely be sufficiently strong to provide mechanical strength and convey wellbore fluids, but while also allowing electrical sensors located within the interior of measurement tubular 25 to transmit and receiving oscillating electric and/or magnetic fields which are too high in frequency to penetrate the conventional prior art steel drill collars. As stated above, the prior art steel collars responded to high frequency electric and/or magnetic oscillating fields by the generation of eddy currents which dissipated the field and prevented the communication inward or outward of electric and/or magnetic oscillating fields. Preferably central section 41 may be composed of KEVLAR-based composite materials. An example of one type of composite tubulars which are currently being utilized in the oil and gas industry are the composite drill pipe, casing pipe, and tubing pipe manufactured by Brunswick Composites, a unit of the Brunswick Technical Group, having a business and correspondence address in Lincoln, Nebr., which offers for sale composite tubulars which have a strength many times greater than that found in steel tubulars, with much less weight, and virtual immunity to corrosion. An article entitled "Developments in Composite Structures for the Offshore Oil Industry" by J. G. Williams of Conoco, Inc., published in May of 1991 at the Offshore Technology Conference, and identified by OTC No. 6579, provides a detailed statement of the current utilization of composite materials in offshore oil and gas activities. Among the numerous uses of composite materials identified in this article is the use of composite drill pipe which has demonstrated its ability to withstand the forces encountered during drilling operations. Numerous composite materials are identified in this article including composites based upon graphite, KEVLAR 29, and KEVLAR 49.

In the present invention, since only azimuthal transmission of the electromagnetic wave is desired, the measurement tubular need only be transmissive of electromagnetic waves which are travelling inward relative to the measurement sonde or outward relative to the measurement sonde. The measurement tubular need not be transmissive of electromagnetic fields along its central longitudinal axis. In the embodiment of FIG. 1B, the entire measurement tubular is constructed of a material which is transmissive of electromagnetic fields; however, in alternative embodiments, such as those depicted in FIGS. 3A, 3B, 4A, 4B, 4C, and 4D, only portions of the measurement tubular need be formed of a material which allows the inward and outward passage of electromagnetic fields. In the particular embodiments depicted and described herein, a plurality of axial slots may be formed in a conventional steel tubular. The axial slots are filled with composite material which is transmissive of electromagnetic fields. Of course, the measurement sonde and the measurement tubular should be aligned so that the antenna is placed proximate the axial slots, and allowed to either transmit electromagnetic fields outward through the axial slots, or to receive magnetic fields which are traveling radially inward through the axial slots.

Figure 1D:
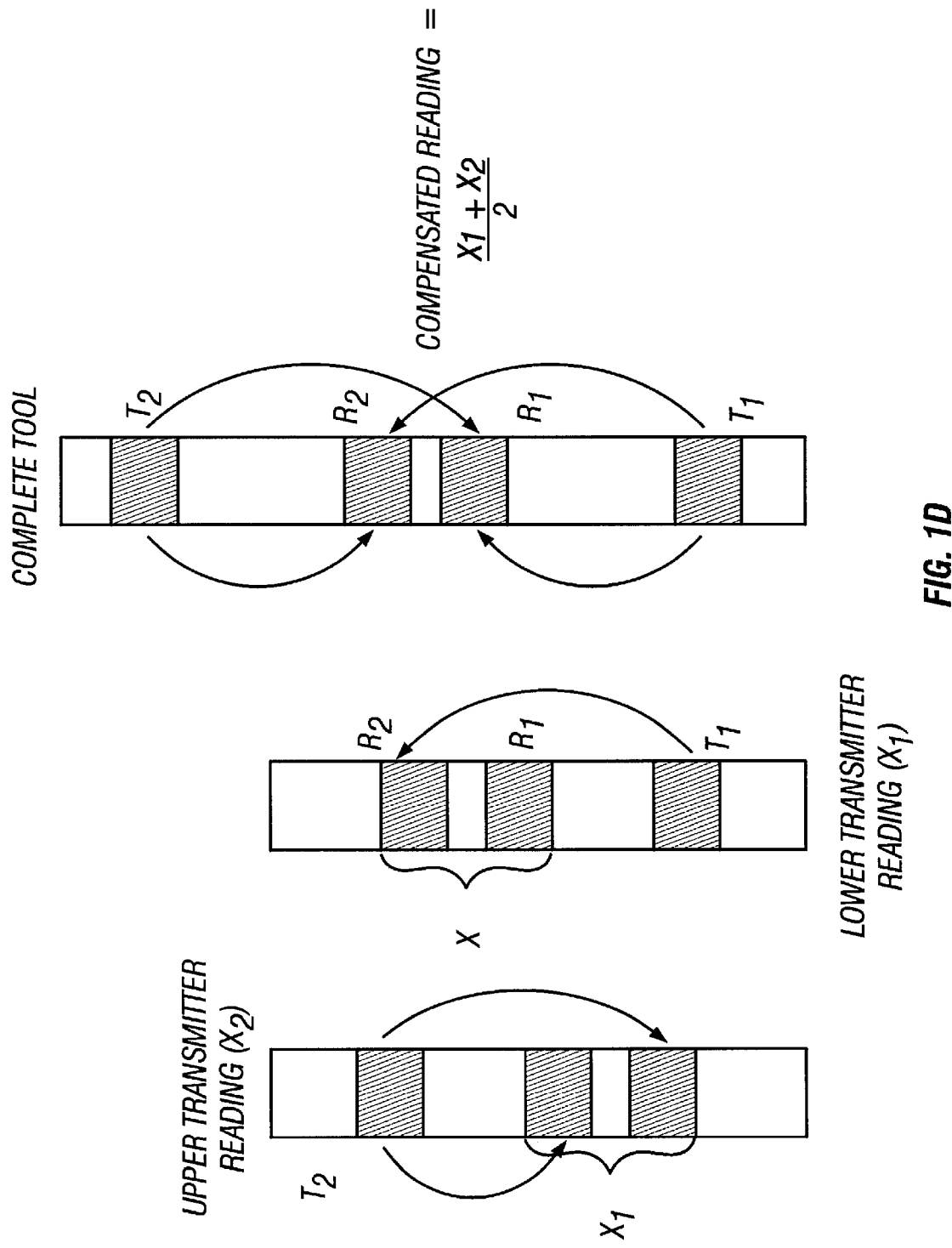
FIG. 1D is a schematic depiction of the operation of the transmitting and receiving antennas.

The operation of measurement sonde 27 is depicted in schematic and graphical form in FIGS. 1D, 1E, 1F, 1G, and 1H. As is depicted in schematic form in FIG. 1D, transmitting antennas $T_1$, $T_2$ are spaced on both sides of a pair of receiving antennas $R_1$, $R_2$, allowing the measurement of both phase and amplitude. The transmitters and receivers are simple antennas consisting of a loop of wire imbedded in an insulating material, with tuning capacitors to trim the antenna response. The tool can be thought of as a pair of sensors, whose output is the average of two readings, reducing tool error from the temperature and pressure affects, tool misalignment, borehole washout and bed shoulder effects. In a vacuum, the finite velocity of electromagnetic radiation leads to a small phase shift between the two receivers $R_1$, $R_2$, while the increased distance to the far receiver causes the signal strength to be weaker at that point. In a more conductive formation, the radiation moves more slowly and attenuates more rapidly. As a result, either the difference in phase between the two receivers, or the ration of amplitudes may be used to measure formation resistivity. As is shown in FIG. 1D, two amplitude and phase readings are made, and then averaged. An upper transmitter reading $X_2$ is made utilizing upper transmitting antenna $T_2$ to propagate an electromagnetic wave outward through measurement tubular 25 (which is not depicted) and into the formation, and then back through measurement tubular 25 to be measured by the intermediate receiving antennas $R_1$, $R_2$. Then, the lower transmitter reading $X_1$ is made utilizing lower transmitting antenna $T_1$ to send an electromagnetic wave outward through measurement tubular 25 (not depicted) into the formation, and then back through measurement tubular 25 to be measured by intermediate receiving antennas $R_1$, $R_2$. The compensated reading is the arithmetic average of lower transmitter reading $X_1$ and upper transmitter reading $X_2$.

Figure 1E:
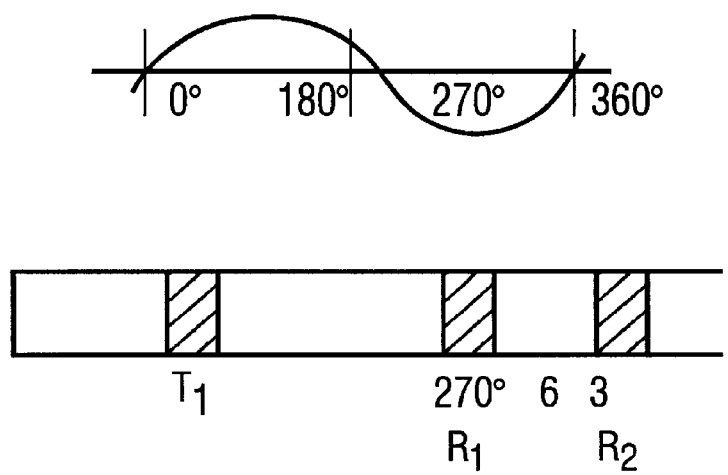
FIG. 1E depicts the phase shift which is detected by the receiving antennas.
Figure 1F:
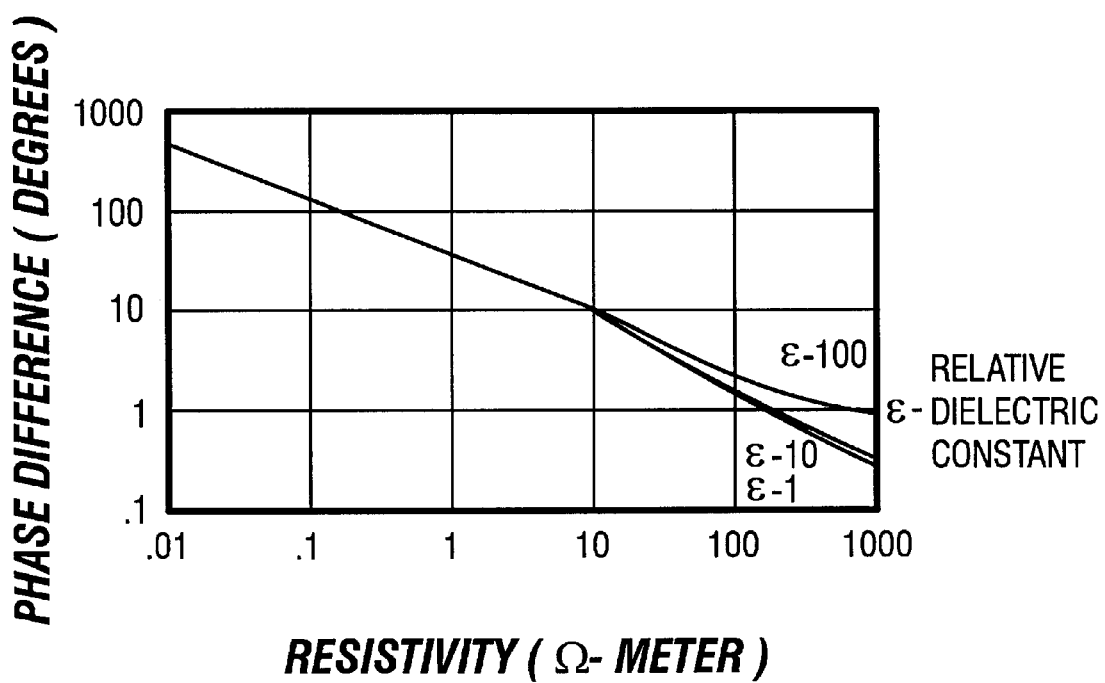
FIG. 1F is a graph which depicts the relationship between resistivity and the detected phase shift.

In the preferred embodiment, the primary measurement is phase resistivity which can be described with reference to FIG. 1E. It is easy to see from this illustration that the greater the spacing between the two receiving antennas $R_1$, $R_2$, the larger the observed phase difference between the receiving antennas. The phase measurement is converted to resistivity, with only small effects from the dielectric constant, after averaging the values from both transmitters. FIG. 1F is a graph which plots resistivity in Ohms-meter to phase difference in units of degrees. A family of curves is shown for different relative dielectric constants (for the specific dielectric constant values of 1, 10, and 100).

Figure 1G:
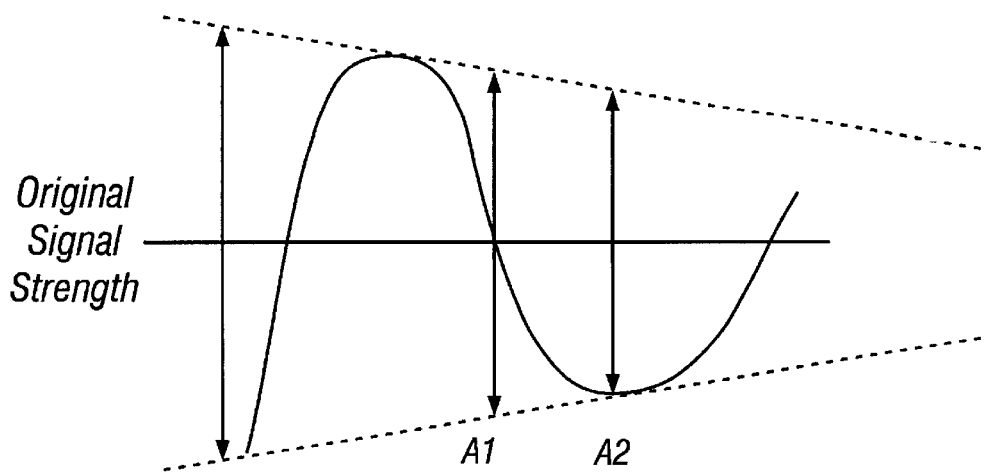
FIG. 1G graphically depicts the amplitude attenuation of the interrogating signal.
Figure 1G:
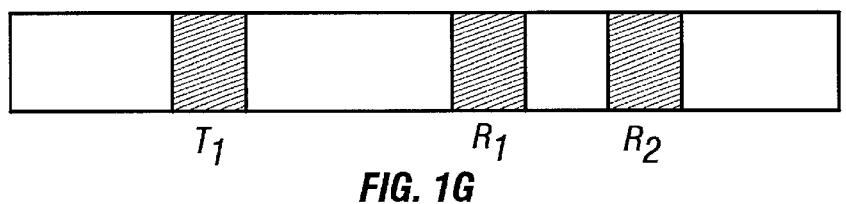
Figure 1H:
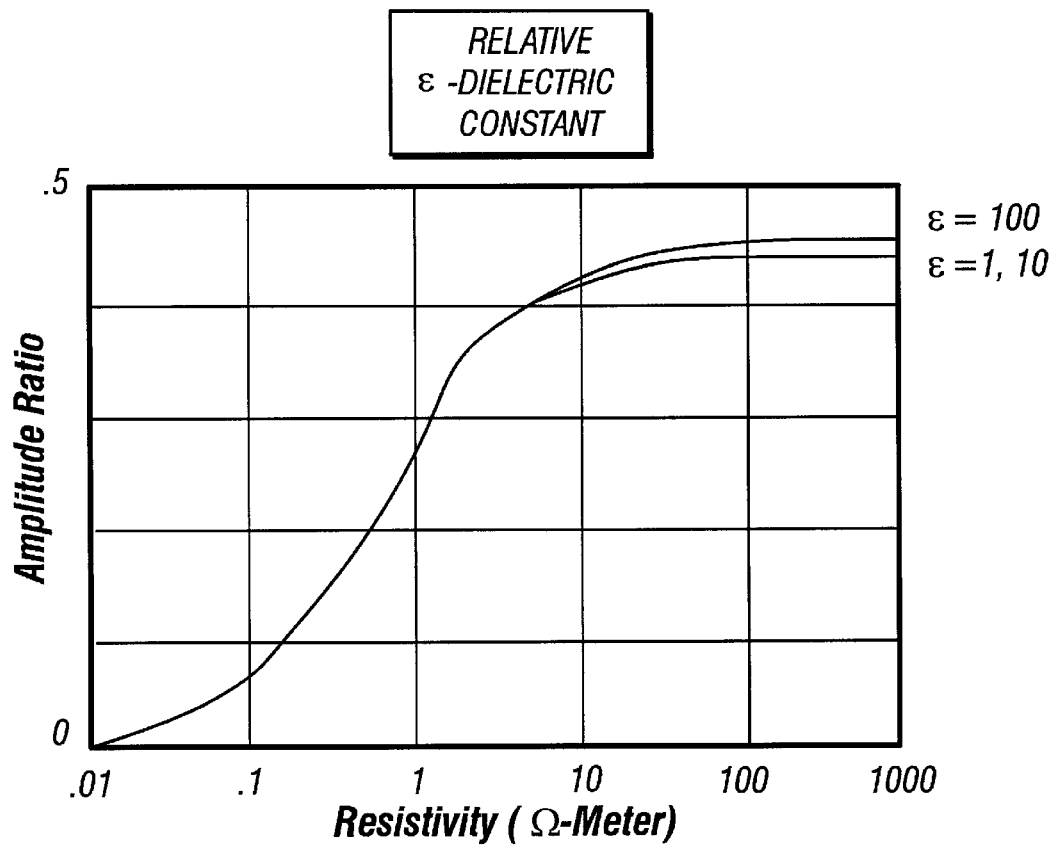
FIG. 1H depicts the graph of the relationship between resistivity and the amplitude ratio.

FIG. 1G depicts the amplitude attenuation which occurs as the electromagnetic wave propagates through the formation. A two megahertz wave, under downhole conditions, propagates only a few feet before the signal strength fades away, so the rate of attenuation or amplitude ratio of the signal is also measured. FIG. 1G graphically depicts the attenuation of the signal from its original signal strength as it passes through measurement tubular 25 and the surrounding formation. Measurements made at receiving antennas $R_1$, $R_2$ can be used to develop an amplitude ratio which is representative of the amount of attenuation that the interrogating signal experiences as it travels between receiving antenna $R_1$ and receiving antenna $R_2$. In the preferred embodiment of the present invention, the tool utilizes a microprocessor with memory to store values of the amplitude for each transmitter into memory, and then computes the ratio of amplitudes for each transmitter, averaging the values for each transmitter to produce a compensated ratio. The amplitude ratio is then transformed to resistivity. FIG. 1H is a graph which plots the relationship of resistivity in units of Ohms-meter to the amplitude ratio, for a plurality of differing relative dielectric constants (and specifically for the relative dielectric constant values of 1, 10, and 100).

The following discussion illustrates how the dual transmitter, dual receiver measurement-while-drilling apparatus of the present invention is utilized to derive an accurate measure of the amplitude attenuation and phase shift of the interrogating electromagnetic signal which travels through the borehole and surrounding formation.

First, consider four transmitter-to-receiver signals:
(Transmitter 1 [X1] to Receiver 1 [R1]): $A_{11}\theta^{\phi 11}$
(Transmitter 1 [X1] to Receiver 2 [R2]): $A_{12}\theta^{\phi 12}$
(Transmitter 2 [X2] to Receiver 1 [R1]): $A_{21}\theta^{\phi 21}$
(Transmitter 2 [X2] to Receiver 2 [R2]): $A_{22}\theta^{\phi 22}$
The measured amplitudes are made up of:

$$A_{mn} = X_m R_n a_{tmn} \quad \text{(Eq. 1.1)}$$

where
 $X_m$=transmitter output variation
 $R_n$=receiver sensitivity variation
 $a_{tmn}$=true amplitude (transmitter M to receiver N);
and the measured phases are made up of:

$$\phi_{mn} = \phi_{Xm} + \phi_{Rn} + \phi_{tmn} \quad \text{(Eq. 1.2)}$$

where
 $\phi_{Xm}$=transmitter phase (output) variation
 $\phi_{Rn}$=receiver phase variation
 $\phi_{tmn}$=true phase (transmitter M to receiver N)
The foregoing general equations correspond to the following more specific equations:

$A_{11} = X_1 R_1 a_{t11}$ $A_{12} = X_1 R_2 a_{t12}$ $A_{21} = X_2 R_1 a_{t21}$ $A_{22} = X_2 R_2 a_{t22}$ $\phi_{11} = \phi_{X1} + \phi_{R1} + \phi_{t11}$ $\phi_{12} = \phi_{X1} + \phi_{R2} + \phi_{t12}$ $\phi_{21} = \phi_{X2} + \phi_{R1} + \phi_{t21}$ $\phi_{22} = \phi_{X2} + \phi_{R2} + \phi_{t22}$ Taking rations of the various transmitter-to-receiver signals produces the following:
For Transmitter 1:

$$\frac{A_{12} e^{\phi 12}}{A_{11} e^{\phi 11}} = \frac{A^{12}}{A_{11}} e^{i(\phi 12 - \phi 11)}$$

and for Transmitter 2:

$$\frac{A_{21} e^{\phi 21}}{A_{22} e^{\phi 22}} = \frac{A^{21}}{A_{22}} * e^{i(\phi 21 - \phi 22)}$$

Multiplying these and taking the square root gives:

$$\sqrt{\frac{A_{12}}{A_{11}} * e^{i(\phi 12 - \phi 11)} * \frac{A_{21}}{A_{22}} * e^{i(\phi 21 - \phi 22)}}$$

$$\sqrt{\frac{A_{12} * A_{21}}{A_{11} * A_{22}}} e^{i\, 1/2(\phi 12 + \phi 21 - \phi 11 - \phi 22)}$$

Straightforward algebraic manipulation of Eqs. 1.1 through 1.3 yields:

$$\sqrt{\frac{a_{t12} * a_{t21}}{a_{t11} * a_{t22}}} * e^{i\, 1/2(\phi t12 + \phi t21 - \phi t11 - \phi t22)}$$

because all the system variables drop out of the measurement.

Therefore, by using two transmitters and two receivers, systematic variables can be removed from both the attenuation (amplitude) and from the phase velocity (phase difference) terms.

Within the context of the preferred embodiment of this invention, in which a sampled-data processing means produces a signal as a function of formation resistivity based on phase-representing signals, the following analysis demonstrates certain matter relevant to the stability feature.

Consider two consecutive samples: Sample A and Sample B.

During Sample A, a first transmitting coil is energized to cause a wave to propagate through the formation in a direction such that the wave passes a first receiving coil (R1), and later passes a second receiving coil (R2), and induces each receiver coil to produce a signal.

During Sample B, a second transmitting coil is energized to cause a wave to propagate through the formation in a direction such that the wave passes a second receiving coil (R2), and later passes the first receiving coil (R1), and induces each receiver coil to produce a signal.

Let φMR2A represent the measured phase of the signal produced by receiver coil R2 during Sample A; let φMR1A represent the measured phase of the signal produced by receiver coil R1 during Sample A; let φMR1B represent the measured phase of the signal produced by receiver coil R1 during Sample B; and let φMR2B represent the measured phase of the signal produced by receiver coil R2 during Sample B.

The φMR2A signal depends on the phase of the wave at the location of R2, and in general, has an error component attributable to various phase shifts including those introduced by the tuned receiver coil, cabling from the receiver coil to the receiver, and the receiver itself. Let φTR2A represent the true phase of the wave at the location or R2 during Sample A, and let φR2E represent the error component so introduced.

$$\phi MR2A = \phi TR2A + \phi R2E \qquad \text{Eq. 2.1}$$

Similarly, the φMR1A signal depends on the phase of the wave at the location or R1, and in general, has its own error component. Let φTR1A represent the true phase of the wave at the location of R1 during Sample A, and let φR1E represent the error component so introduced.

$$\phi MR1A = \phi TR1A + \phi R1E \qquad \text{Eq. 2.2}$$

During Sample A, the φMR1A signal and the φMR2A are simultaneously processed to produce a DeltaA signal that represents the difference in phase between these two signals (i.e., φMR1a−φMR2A).

$$\text{Delta } A = (\phi TR2A - \phi TR1A) + (\phi R2E - \phi R1E) \qquad \text{Eq. 2.3}$$

The component of the DeltaA signal representing the true phase difference (φTR2A−φTR1A) is a function of the resistivity of the formation in the region between the two receiver coils. Let F(rho) represent this component.

$$\text{Delta} A = F(rho) + (\phi R2E - \phi R1E) \qquad \text{Eq. 2.4}$$

Similarly, during Sample B, the φMR2B signal and the φMR1B are simultaneously processed to produce a DeltaB signal that represents the difference in phase between these two signals (i.e., φMR2B−φMR1B).

$$\phi MR1B = \phi TR1B + \phi R1E \qquad \text{Eq. 2.5}$$

$$\phi MR2B = \phi TR2B + \phi R2E \qquad \text{Eq. 2.6}$$

$$\text{Delta} B = (\phi TR1B - \phi TR2B) + (\phi R1E - \phi R2E) \qquad \text{Eq. 2.7}$$

The component of the DeltaB signal representing the true phase difference (φTR1B−φTR2B) is a function of the resistivity of the formation in the region between the two receiver coils; i.e., it equals f(rho).

$$\text{Delta} B = f(rho) + (\phi R1E - \phi R2E) \qquad \text{Eq. 2:8}$$

The Delta A signal is recorded so that it can be retrieved and processed with the Delta B signal.

By adding Equations 2.7 and 2.8, it follows that:

DeltaA+DeltaB=2*f(rho)+φR2E−φR1E−φR2E+φR1E and $$f(rho) = \frac{1}{2} * (\text{Delta} A + \text{Delta} B) \qquad \text{Eq. 2.9}$$

In other words, a computed signal representing the sum of the consecutive samples is a function of formation resistivity, and error components such as φR1E and φR2E do not introduce errors into this computed signal.

FIGS. 2A, 2B, 2C, 2D, and 2E depict the electronics carried by measurement sonde 27 in block diagram and electric schematic form. As is shown in FIG. 2A, processor 101 directs the operation of drive circuits 105, 107 and receiver circuit 103. Drive circuit 107 operates to energize selectively transmitting antenna $T_2$, while drive circuit 105 operates to energize selectively transmitting antenna $T_1$. Receiver circuit 103 receives the measurements of the electromagnetic field made by receiving antennas $R_1$, $R_2$. Processor 101 supplies data to telemetry system 109, and receives instructions from telemetry system 109. Telemetry system provides the electrical commands to a mud pulse telemetry actuator which is in communication with a fluid column in the wellbore, and which is utilized to impress a coded message in the fluid column.

Figures 2, 2C, 3:
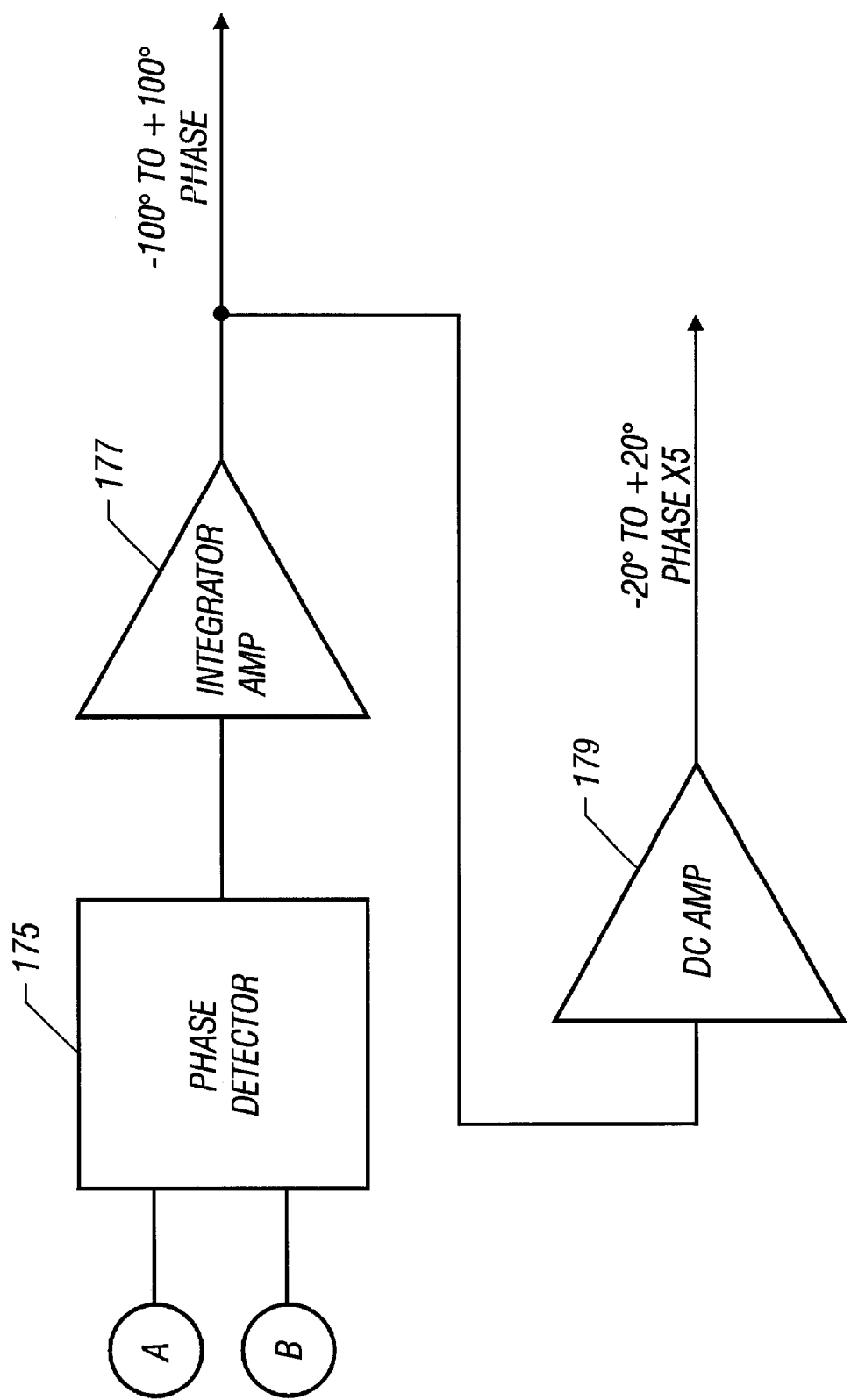
Figure 2D:
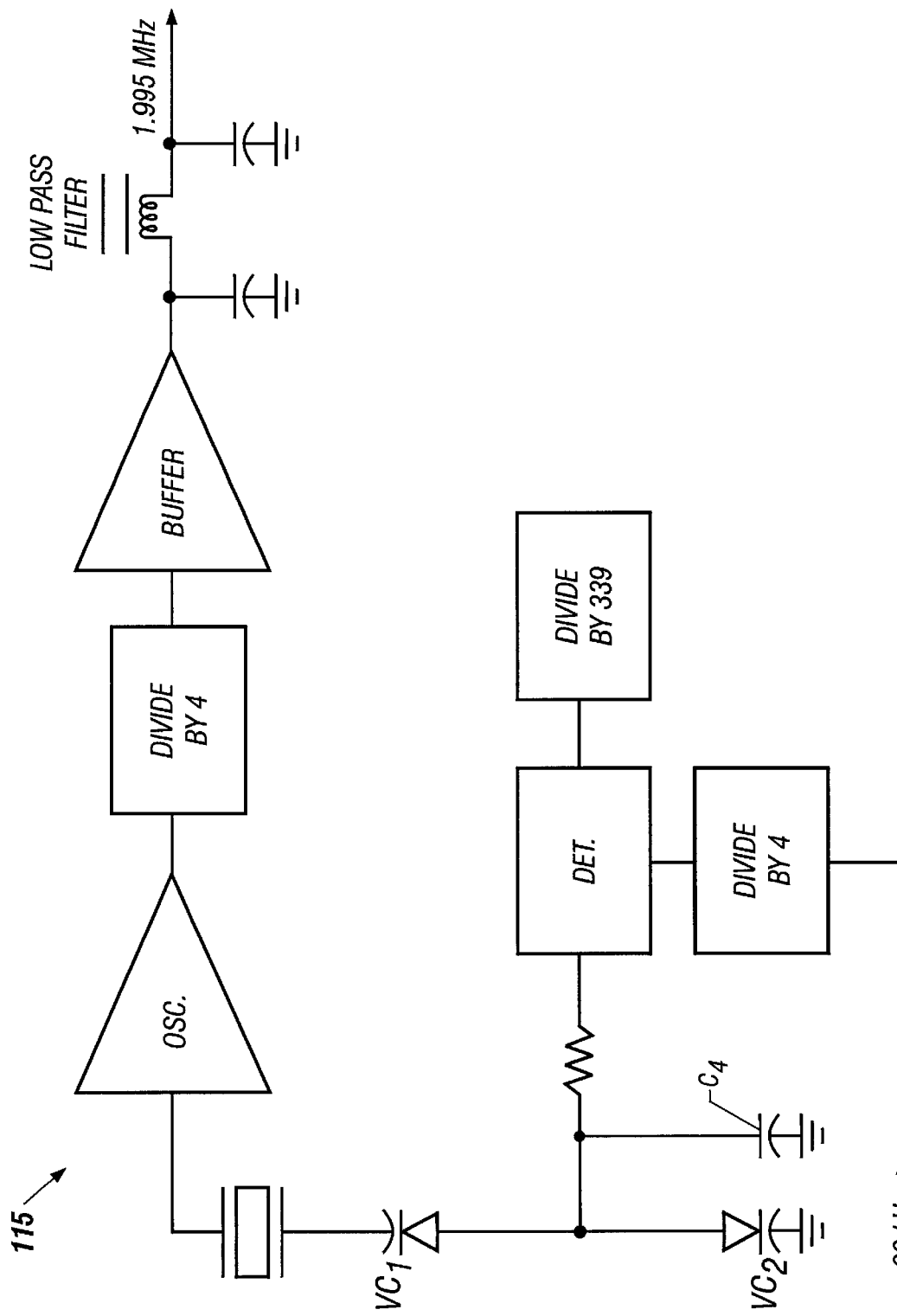
Figure 2E:
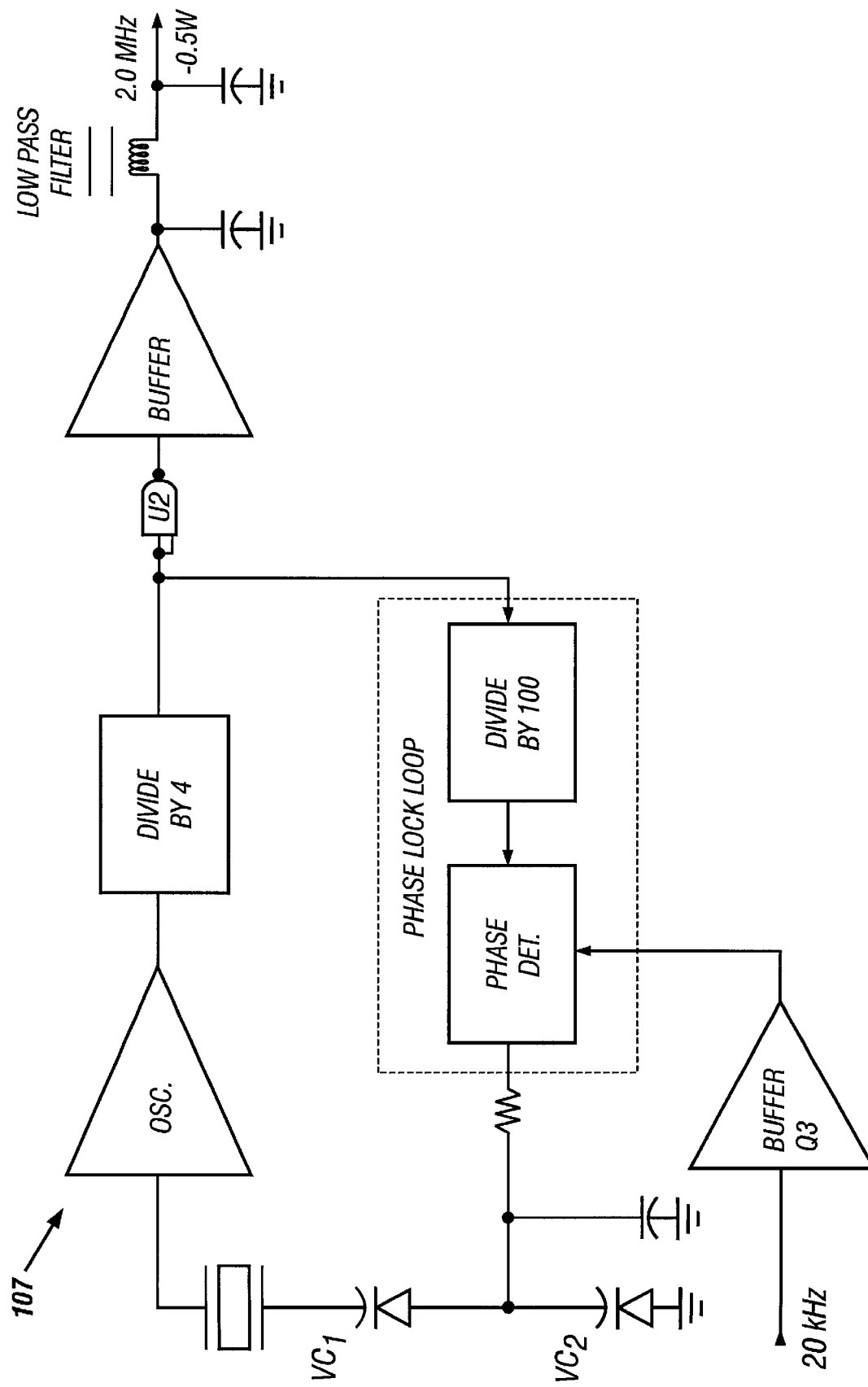

The principle components of the electronics carried by measurements sonde 27, which are depicted in block diagram form in FIG. 2A, are depicted in detail in FIGS. 2B, 2C, 2D, and 2E, with FIGS. 2B, 2C, and 2D respectively depicting the dual receiver 111, amplitude/phase detector 113, and the local oscillator 115 which comprise the significant operational components of receiver circuit 103, and with FIG. 2E depicting drive circuit 107 of FIG. 2A, which is identical to drive circuit 105, of FIG. 2A.

First with reference to FIG. 2B, there is depicted dual receiver 111 in simplified electrical schematic form. In broad overview, the signals from receiving antennas $R_1$, $R_2$ are fed to dual receiver 111. The signals are amplified at RF amplifiers 119, 121 and heterodyned with the output of the 1.995 megahertz local oscillator 117, which provides a resultant 5 kilohertz intermediate frequency (IF). The intermediate frequency will retain the phase relationship of the two receiver signals by using a common oscillator for mixers 123, 125. The signals are passed to intermediate frequency (IF) amplifiers 127, 129 for further amplification. The signals are then passed through 500 hertz band pass filters 131, 133 before being fed to the amplitude/phase detector 113 of FIG. 2C.

Now more particularly, the dual receiver 111 of FIG. 2B receives the 2 megahertz signal from receiving antennas $R_1$, $R_2$, which are coupled to the input of RF amplifiers 119, 121. The coupling components are specifically selected to minimize phase shift with temperature. The RF amplifiers 119, 121 have a gain of 15 db and the output is coupled to the balanced mixers 123, 125. The output of the local oscillator is injected to the mixer via a power splitter arrangement to provide equal amplitudes with zero degrees of phase shift to each mixer. The splitter, combined with a 6 db attenuator, will ensure the proper level and also minimize cross talk between the two mixers. A balanced mixer is used to minimize local oscillator feed-through to the output. The mixer stage has a gain of 20 db. The mixer output is fed through five kilohertz low pass filters 135, 137 and coupled to the non-inverting input of IF amplifiers 127, 129, which provides an 18 db gain. The output of IF amplifier 127, 129 is fed through 500 hertz band pass filter op amps 131, 133 which provide a 20 db gain. This final amplification has a very high Q 500 hertz band pass filter. The passive components of the filter must be matched to ensure minimal phase shift with frequency and temperature. It is important that both filters remain matched.

The amplitude/phase detector 113 is depicted in FIG. 2C. The amplitude/phase detector 113 has a separate automatic gain (AGC) circuit for each IF signal received, which provides constant amplitudes for the phase detector. The AGC circuit's control voltage to the is proportional to the amplitude of the IF signal providing a DC signal corresponding to the received signal level. The DC level is used by the processor as the amplitude of the received signal level. The output of the phase detector is a pulse which is proportional to the phase shift between the two IF signals. This voltage is integrated and amplified to provide phase outputs of 100° and 20°. The resultant signal is fed to the microprocessor board which initiates a measurement cycle, times the events during that cycle, samples data from the receiver, stores data in memory, and communicates with a tool bus.

The automatic gain control circuit has a dual purpose: to detect the amplitude of the incoming signal from the dual receiver 111 of FIG. 2B, and to maintain a constant amplitude signal to the phase detector. The automatic gain control contains for each channel an Analog Devices linear divider 139, 141. The output of the linear dividers 139, 141 ($V_0$) is equal to the intermediate frequency IF divided by a DC level ($V_z$). The output of each analog divider 139, 141 is connected to low pass filter 143, 145, with a cut off of 7.5 kilohertz to remove any high frequency noise. This signal is fed to an RMS-to-DC converter 147, 149. An error amplifier 155, 157 compares the output of converters 147, 149 to a reference signal provided by reference signal generators 151, 153, and generates a control voltage dependent upon the difference. To prevent a loop lock-up, negative values resulting from the loss of signal are diode-blocked by diodes 159, 151 which are coupled between error amplifiers 155, 157 and output buffers 163, 165. The control voltage is fed to the automatic gain control to maintain a constant output, and to the processor for amplitude information. The IF signals from the automatic gain control circuit are capacitively coupled to inverting buffers 167, 169 for phase detection, to eliminate any DC offset. Preferably, the $IF_2$ signal is inverted 180°. This allows the output of the phase detector to be in the range of −180° to +180°, instead of being in the range of 0° to 360°. The signals are then squared-up with a zero crossing detector 171, 173, and passed to a 4013 dual flip-flop set which function as phase detector 175. To accomplish this, the supply voltage flip-flop is not grounded. Instead, a positive voltage is powered from a floating supply so that what would normally be considered a low voltage (ground) will be a negative voltage or −180°. Likewise, a high level will be a positive voltage, or +180°. The clock inputs are used so that the phase detector will not be sensitive to cycle variation in the IF square waves. The phase detector output will be as follows:

(1) a square wave input from receiver $R_1$ intermediate frequency $IF_1$ sets pin 1 high;

(2) a square wave input from receiver R2 intermediate frequency IF sets pin 13 high;

(3) a high on pin 13 resets both flip-flops sending pin 1 low.

If the receive signals are in phase, the signals to the flip-flop would have 180° of phase difference due to the inversion of $IF_2$. This would result in the phase detector having a 50% duty cycle on pin 1, switching between negative 4.5 volts and positive 4.5 volts. This would result in zero volts on the low pass filter of integrator amplifier 177. As the phase differential increases, so does the positive pulse width, causing a negative voltage out. Likewise, a negative phase input causes a negative pulse width resulting in a negative DC level from the filter. The gain in the low pass filter is set so that 100° equals 5 volts. This signal is used by the processor for the plus or minus 100° input and is also amplified five times by DC amplifier 179, for the 20° of phase difference to equal a 5 volt output.

FIG. 2D depicts a local oscillator 115 which generates the 1.995 megahertz injection for the receiver mixers of FIG. 2B. Local oscillator 115 consists of a voltage controlled oscillator, a phase lock loop, and a final amplifier. A 20 kilohertz reference is supplied for the phase lock loop. A voltage controlled crystal (Colpitts) oscillator is utilized to reduce frequency error due to vibration downhole. The voltage controlled oscillator is locked to a reference frequency so the IF will be 5 kilohertz. A higher frequency crystal (7.982 megahertz) is used to increase the tuning range of the circuit. The oscillator is tuned to the desired center frequency by variable capacitance diodes VC1 and VC2. Control voltage for the diodes is supplied by the phase lock loop as follows. The output of the oscillator is divided by 4 to obtained the desired 1.995 megahertz frequency which is coupled to pin 9 of an MC14569 programmable binary down counter. To achieve a division ratio of 399, the MC14569 is cascaded with the programmable counter in the MC14568. The remaining counter in the MC14568 is used to divide the 20 kilohertz reference by 4 to provide a 5 kilohertz reference for the phase detector. The 5 kilohertz out of the divider (1.995/399) is compared to the 5 kilohertz reference by the MC14568 phase detector. Pulses out of the phase detector on pin 13 represent the frequency error between the divided 1.995 megahertz and the 5 kilohertz reference. These pulses are integrated by capacitor C4 to provide a correction voltage for diodes VC1 and VC2 to bring the oscillator back on frequency. The 1.995 megahertz is buffered by three 4049 inverters which are tied in parallel. A Pi network is used to match the output of the 4049's to 90 Ohms and also attenuate the harmonics of the 1.995 megahertz square wave. The power output of the local oscillator is approximately 10 milliwatts or +10 dbm.

FIG. 2E depicts drive circuit 107 of FIG. 2A, which is identical to drive circuit 105 of FIG. 2A. Each drive circuit is identical, except that each has a different transmit control voltage. Each transmitter drive circuit consists of a voltage controlled crystal oscillator, a phase lock loop, a final amplifier, and a transmitter on/off control. The 20 kilohertz reference is provided. To ensure a satisfactory lock range, a 8 megahertz voltage controlled crystal oscillator is used in the transmitters. The frequency is adjusted by the variable capacitants of VC1 and VC2. The output is divided by 4 to obtain the desired 2 megahertz final frequency. The two megahertz output signal is coupled to the phase lock loop, which in turn divides the 2 megahertz signal by 100 to obtain the 20 kilohertz reference frequency to compare with the 20 kilohertz from the phase detector. Pulses from the phase detector represent the frequency error. A correction voltage is supplied to VC1 and VC2 to bring the oscillator back on frequency. The 2 megahertz signal is also tied to U2 which controls the output of the transmitter. The output stage is driven into class D operation by using a square wave input which results in higher amplifier efficiency. A low pass filter is used to reduce the harmonics. The cut off for this filter is 3 megahertz. The power output of the transmitter is approximately 0.5 watts (27 dmb).

Figure 3B:
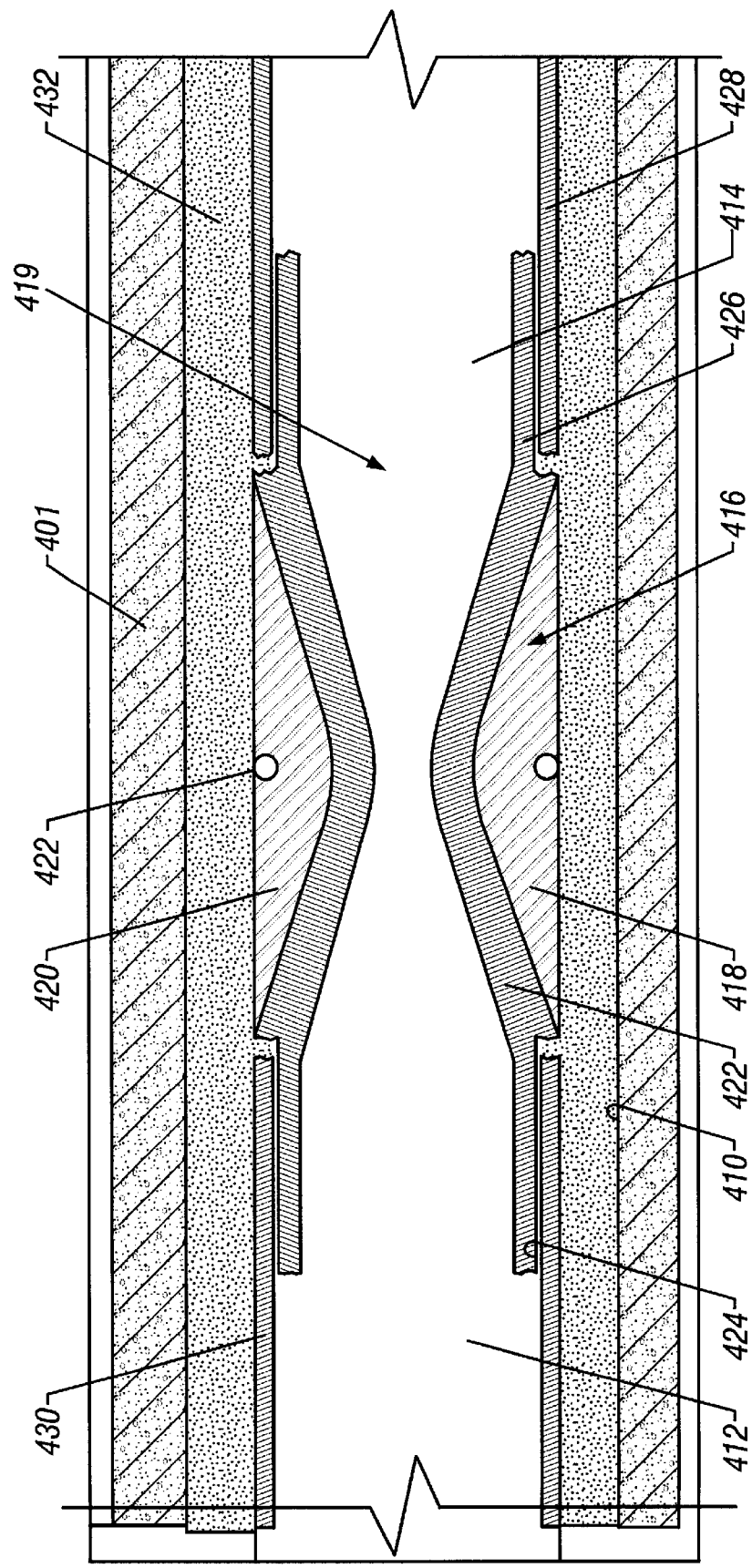

FIGS. 3A, 3B, 4A, 4B, 4C, and 4D depict two embodiments of the present invention. FIGS. 3A and 3B depict measurement tubular 401 and measurement sonde 419 which is adapted to be positioned within the central bore 410 of measurement tubular 401. Measurement tubular 401 is composed substantially of steel, as are other prior art drill collars; however, measurement tubular 401 includes four regions which include a plurality of axial slots which are disposed circumferentially about measurement tubular 401 and which extend through the width of measurement tubular 401, but which are filled with a poorly-conducting or non-conducting material, such as a KEVLAR material or such as an epoxy or ceramic material. The axial slots which are filled with non-conducting or poorly-conducting material allow for the inward and outward passage of electric and/or magnetic oscillating fields, but which prevent the passage of fluid through measurement tubular 401. As is shown in FIG. 3A, upper transmitter region 402 includes the axial slots which allow for the inward and outward passage of electric and/or magnetic oscillating fields. Likewise, lower transmitter region 407 includes the axial slots which allow for the inward or outward passage of electric and/or magnetic oscillating fields. Receiver regions 403, 405 are provided in a position intermediate the transmitter regions 402, 407. Receiver regions 403, 405 also include the axial slots filled with poorly-conducting or non-conducting material, which allow for the inward or outward passage of electric and/or magnetic oscillating fields. The regions which contain the axial slots filled with poorly-conducting or non-conducting material are separated and surrounded by solid regions 409, 411, 413, 415, and 417, which do not allow for the passage of electrical and/or oscillating fields, since they are composed of steel which dissipates the electrical and/or magnetic oscillating field by the formation of eddy currents. Measurement sonde 419 is disposed adjacent measurement tubular 401 in the depiction of FIG. 3A. In actual use, measurement sonde 419 is disposed within the central bore (which is depicted only in FIG. 3B) of measurement tubular 401. Measurement sonde 419 is composed of upper transmitter assembly and pressure housing 421 which contains the upper transmitting antenna, receiver assembly and middle pressure housing 425 which contain the receiving antennas, and lower transmitter assembly and pressure housing 429 which contain the lower transmitter. Upper paddle assembly 423 and lower paddle assembly 427 are provided to centralize and position measurement sonde 413 within the central bore of measurement tubular 401. The electrical, electronic, and data processing components which cooperate to allow for the reception and transmission modes of operation are contained within the pressure housings 421, 425, 427. Upper transmitter 431 is disposed on the exterior surface of upper transmitter assembly and pressure housing 421 and is adapted to be aligned with transmitter region 402 when measurement sonde 419 is positioned within the central bore of measurement tubular 401. Lower transmitter 437 is carried about the exterior portion of lower transmitter assembly and pressure housing 429 and is adapted in position to be aligned with transmitter region 407 of measurement tubular 401 when measurement sonde 419 is positioned within the central bore of measurement tubular 401. Receiver antennas 433, 435 are carried by receiver assembly and middle pressure housing 425 and adapted in position to align with receiver regions 403, 405 when measurement sonde 419 is positioned within the central bore of measurement tubular 401. The axial slots in measurement tubular 401 which are filled with poorly-conducting or non-conducting material allow for the sonde-based measurement of well parameters outside the drillstring which would normally be impeded by the presence of a steel collar. The slots are constructed such that the collar of measurement tubular 401 maintains its structural integrity necessary for drilling operations, and drilling fluids are not allowed to flow through the axial slots since the non-conducting or poorly-conducting materials are solid fluid-impermeable materials.

FIG. 3B is a partial longitudinal section view of measurement sonde 419 disposed within central bore 410 of measurement tubular 401. As is shown, electronics cavities 412, 414 are provided above and below antenna section 416. Antenna section 416 includes an antenna cavity 418 which is filled with fiberglass 420, which surrounds antenna wire 422. Antenna section includes antenna housing sleeve 422 which includes upper lip 424 and lower lip 426 which mate with mandrel 428 and mandrel 430 of measurement sonde 419. As is shown, mud flows between measurement tubular 401 and measurement sonde 419. The electronics contained within electronics cavities 412, 428 are protected from the mud flow.

Figure 4A:
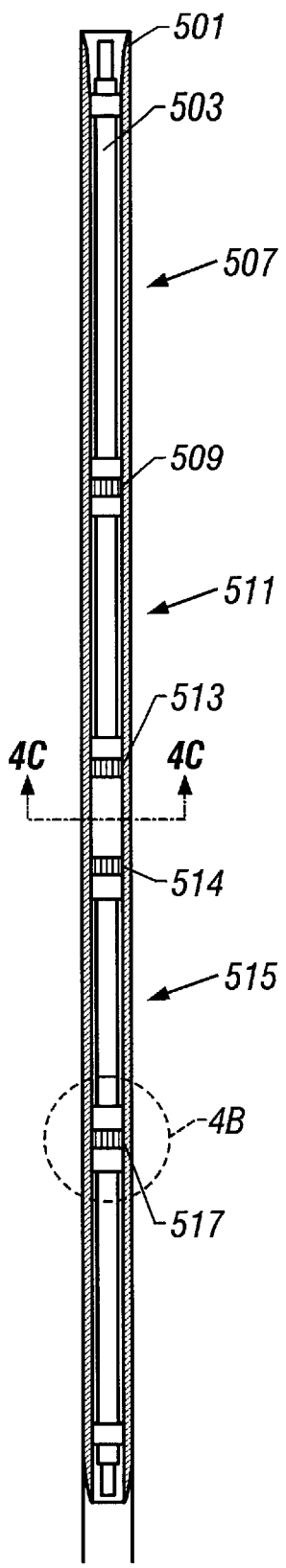
FIGS. 4A, 4B, 4C, and 4D depict another embodiment of the present invention.
Figure 4C:
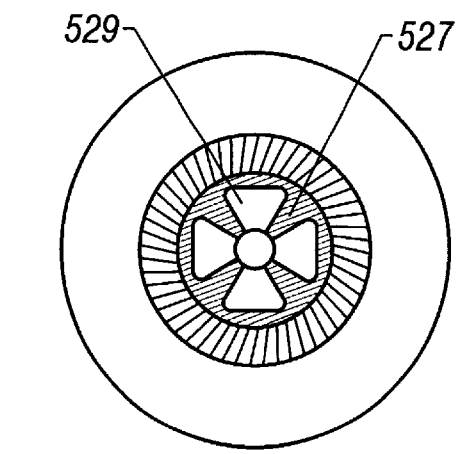
Figure 4B:
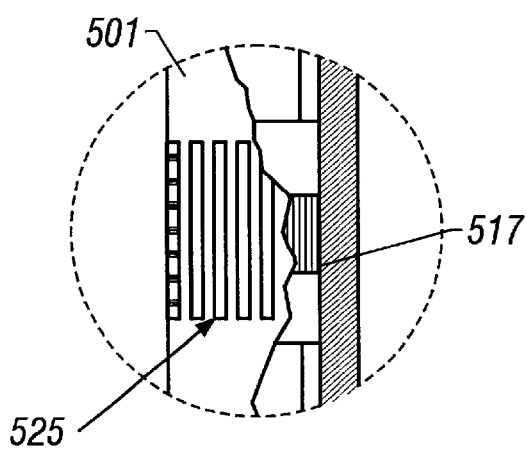

FIG. 4A depicts an alternative embodiment of the present invention which is especially useful in slim-hole applications. For purposes of this application "slim hole" applications are these which utilize tubulars having and outer diameter of six (6) inches or less. Measurement sonde 503 is shown disposed within central bore of measurement tubular 501. Preferably, measurement tubular 501 is formed of a reduced radial diameter in the range of three to four inches. Measurement sonde 503 is adapted to engage the central bore of measurement tubular 501, in the areas of the antennas so that the antennas can be as large in diameter as possible and so that the antennas can serve a second purpose and locate the sonde 503 within the bore 501. Measurement sonde 503 includes a controller and transmitter electronics subassembly 507, transmitter antenna 509, receiver electronics subassembly 511, receiver antennas 513, 514, transmitter electronics housing 515, and transmitter antenna 517. FIG. 4B is a detail view of the region of transmitter 517. Measurement tubular 501 is shown in fragmentary section view. It is equipped with a plurality of axial slots 525 which are filled with poorly-conducting or non-conducting epoxy or KEVLAR material. Transmitter 517 is carried adjacent the axial slots 525. FIG. 4C is a cross-section view as seen along section lines C—C of FIG. 4A. As is shown, a plurality of spokes 527 and axial slots 529 are provided. Drilling mud is pumped downward through axial slots 529 in the region of the antennas. This arrangement has several significant advantages over the prior art. First, the measurement sonde 503 may be mechanically supported by measurement tubular 501 preventing movement of measurement sonde 503. Second, the close alignment between measurement tubular 501 and measurement sonde 503 prevents the flow of drilling fluids in the region of the transmitting and receiving antennas, thus minimizing the possibility of damage to the antennas. Third, the transmitting and receiving antennas are placed as closely as possible to the axial slots in measurement tubular 501 to increase measurement efficiency and reduce power requirements for the logging tool. The measurement tubular can of course be constructed of a non-conducting or poorly-conducting collar as described earlier instead of a slotted collar.

Figure 4D:
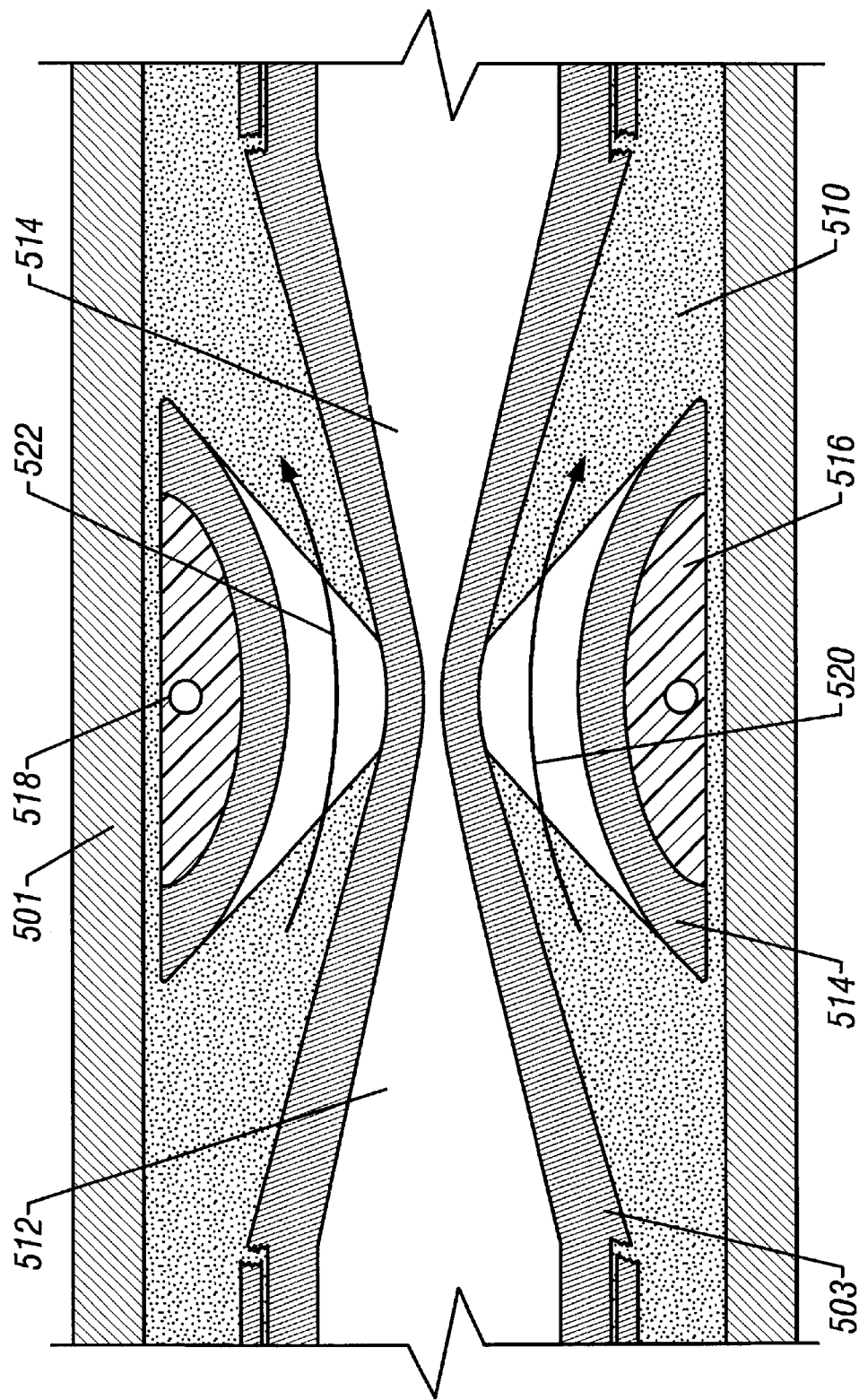

FIG. 4D is a longitudinal section view taken along section line D—D of FIG. 4C. As is shown, measurements on 503 is disposed within central bore 510 of measurement tubular 501. Electronic cavities 512, 514 are provided for housing the logging tool electronics. Antenna section is provided with a C-shaped sleeve which is filled with fiberglass 516, and which houses antenna wire 518. Flowpaths 520, 522 are provided between C-shaped sleeve and the main body of measurement sonde 503. Drilling mud is routed through flow passages 520, 522 in the region of antenna 518. Antenna 518 is placed as closely as possible to measurement tubular 501, which may be formed from a poorly-conducting material, or which may include axial slots which allow for the inward and outward passage of electromagnetic fields.

The embodiments discussed herein have focused on the utilization of resistivity logging tools within measurement tubulars which are formed at least in-part by a poorly-conducting or non-conducting material; however, other types of measurement tools may be formed in and carried on measurement sondes which are placed inside measurement tubulars which are partially formed of non-conducting or poorly-conducting materials, such as dielectric logging tools and other tools which utilize oscillating electric and/or magnetic fields to sense or detect conditions exterior of the logging tool which relate to either the borehole or surrounding formation. One example of such a dielectric logging tool which can be used as is described in the present invention is set forth in U.S. Pat. No. 4,107,598 to Meador et al. In alternative embodiments, resistivity and dielectric logging tools may be combined in a single sonde to allow for multiple types of measurement to occur simultaneously or successively. The types of information which can be derived from resistivity and dielectric logging tools can be utilized to define a plurality of borehole and formation conditions, including a measure of the borehole diameter, a measure of the diameter of invasion of drilling muds, a measure of the formation resistivity, and the utilization of amplitude attenuation and phase shift measurements (which see differing depths of the formation) for the location and detection of bed and boundary changes. An example of the utilization of amplitude and phase data to perform caliper operations in a wellbore, and to detect bed and boundary changes is set forth in U.S. Pat. No. 4,899,112 to Clark, which is entitled "Well Logging Apparatus For Determining Formation Resistivity At A Shallow Depth And A Deep Depth".

In particular embodiments of the present invention, the measurement sonde may be equipped with a conventional fishing neck disposed at its upper most position, which allows the measurement sonde to be run into or out of the measurement tubular during drilling operations utilizing a conventional wireline-base retrieval apparatus. Typically, the retrieval apparatus includes a component which is profiled to engage the fishing neck of the measurement sonde. In this way, the measurement sonde may be removed for repair or replacement during drilling operations, without requiring that the entire drillstring be pulled.

While the invention has been shown in only several preferred forms, it is not thus limited but is susceptible to various changes and modifications without departing from the spirit thereof.

What is claimed is:

1. A measurement-while-drilling (MWD) apparatus for use with a drillstring during drilling operations for obtaining information about a parameter of interest, comprising:
   (a) a measurement tubular that includes a central bore that communicates with a central bore of said drillstring;
   (b) a measurement sonde located within the measurement tubular for obtaining measurements on the parameter of interest, said measurement sonde including:
      (i) at least one transmitter for inducing an electromagnetic signal in the formation through the measurement tubular, and
      (ii) at least one receiver for receiving the induced electromagnetic signal in the formation through the measurement tubular; and
   (c) a retrieval member on the measurement sonde adapted to facilitate an operation selected from (i) retrieval of the measurement sonde from the measurement tubular during drilling operations, and, (ii) placement of the measurement sonde within the measurement tubular during drilling operations.

2. The MWD apparatus of claim 1 wherein the at least one transmitter comprises two transmitters and the at least one receiver comprises two receivers.

3. The MWD apparatus of claim 1 wherein the measurement tubular adjacent the at least one transmitter and the at least one receiver is made of a material selected from (i) a poorly conducting material, and (ii) a non-conducting material.

4. The MWD apparatus of claim 1 wherein the measurement tubular adjacent the at least one transmitter and the at least one receiver is made of a material comprising carbon fiber.

5. The MWD apparatus of claim 1 wherein the measurement tubular comprises a member made of a conducting material and wherein the portion of the member adjacent the at least one transmitter and the at least one receiver is provided with a plurality of axially aligned slots circumferentially disposed around the measurement member, said axially aligned slots being filled with a material selected from (i) a poorly conducting material, and (ii) a non-conducting material.

6. The MWD apparatus of claim 5 further comprising a second member disposed around the first member, said second member being made of a material selected from (i) a poorly conducting material, and (ii) a non-conducting material.

7. The MWD apparatus of claim 1 wherein the measurement sonde further comprises a data processor for processing said measurements on the parameter of interest.

8. The MWD apparatus of claim 2 wherein the two receivers are disposed between the two transmitters.

9. The MWD apparatus of claim 1 wherein the measurement sonde is powered by one of (i) a battery, and (ii) a turbine.

10. The MWD apparatus of claim 1 wherein the parameter of interest is at least one of (i) the resistivity of the formation, and (ii) the dielectric constant of the formation.

11. The MWD apparatus of claim 1 wherein the MWD apparatus is adapted for slimhole operations with the measurement sonde engaging the central bore of the measurement tubular in the portion of the measurement sonde in the vicinity of the at least one transmitter and the at least one receiver (the antenna sections).

12. The MWD apparatus of claim 11 wherein each antenna section further comprises:
   (i) a plurality of axial slots for passage of drilling mud;
   (ii) a C-shaped sleeve for isolating an antenna in the antenna section from the drilling mud and urging the antenna against the measurement tubular; and
   (iii) a plurality of spokes defining the axial slots therebetween and for supporting the C-shaped sleeve.

13. The MWD apparatus of claim 12 wherein each antenna section further comprises at least one electronic cavity for housing electronic equipment associated with the antenna.

14. A method of obtaining measurements relating to a parameter of interest of a formation surrounding a borehole drilled by a drillbit conveyed on a drilling tubular, the method comprising:
   (a) detachably coupling a measurement sonde within a measurement tubular having a central bore in communication with a central bore of said drilling tubular;
   (b) activating a transmitter on the measurement sonde thereby inducing an electromagnetic signal in the formation through the measurement tubular; and
   (c) detecting with a receiver on the measurement sonde a detected signal indicative of the induced electromagnetic signal and the parameter of interest.

15. The method of claim 14 wherein the measurement tubular adjacent the transmitter and the receiver is made of a material selected from (i) a poorly conducting material, and (ii) a non-conducting material.

16. The method of claim 14 wherein the measurement tubular comprises a member made of a conducting material and wherein the portion of the member adjacent the at least one transmitter and the at least one receiver is provided with a plurality of axially aligned slots circumferentially disposed around the measurement member, said axially aligned slots being filled with a material selected from (i) a poorly conducting material, and (ii) a non-conducting material.

17. The method of claim 14 further comprising processing the detected signal with a data processor on the measurement sonde to give the parameter of interest.

* * * * *